(12) United States Patent
Liu et al.

(10) Patent No.: US 12,164,147 B2
(45) Date of Patent: Dec. 10, 2024

(54) DEVICE, METHOD AND SYSTEM FOR OPTICAL COMMUNICATION WITH A WAVEGUIDE STRUCTURE AND AN INTEGRATED OPTICAL COUPLER OF A PHOTONIC INTEGRATED CIRCUIT CHIP

(71) Applicant: Intel Corporation, Santa Clara, CA (US)

(72) Inventors: Changhua Liu, Chandler, AZ (US);
Pooya Tadayon, Portland, OR (US);
Zhichao Zhang, Chandler, AZ (US);
Liang Zhang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 17/359,178

(22) Filed: Jun. 25, 2021

(65) Prior Publication Data

US 2022/0413210 A1   Dec. 29, 2022

(51) Int. Cl.
| | |
|---|---|
| *G02B 6/122* | (2006.01) |
| *G02B 6/30* | (2006.01) |
| *G02B 6/42* | (2006.01) |
| *G02B 6/12* | (2006.01) |

(52) U.S. Cl.
CPC .............. *G02B 6/122* (2013.01); *G02B 6/305* (2013.01); *G02B 6/4204* (2013.01); *G02B 2006/12061* (2013.01); *G02B 2006/12102* (2013.01)

(58) Field of Classification Search
None
See application file for complete search history.

(56) References Cited

U.S. PATENT DOCUMENTS

| | | |
|---|---|---|
| 4,755,014 A | 7/1988 | Stoll et al. |
| 4,756,591 A | 7/1988 | Fischer et al. |
| (Continued) | | |

FOREIGN PATENT DOCUMENTS

DE    19613755    10/1997

OTHER PUBLICATIONS

Extended European Search Report for European Patent Application No. 22162068.5, dated Sep. 8, 2022.
(Continued)

*Primary Examiner* — Jerry Rahll
(74) *Attorney, Agent, or Firm* — Essential Patents Group, LLP

(57) ABSTRACT

Techniques and mechanisms for optically coupling a photonic integrated circuit (PIC) chip to an optical fiber via a planar optical waveguide structure. In an embodiment, a PIC chip comprises integrated circuitry, photonic waveguides, and integrated edge-oriented couplers (IECs) which are coupled to the integrated circuitry via the photonic waveguides. The PIC chip forms respective divergent lens surfaces of the IECs, which are each at a respective terminus of a corresponding one of the photonic waveguides. A planar optical waveguide structure, which is adjacent to the IECs, comprises a core which is optically coupled between the PIC chip and an array of optical fibers. In another embodiment, an edge of the PIC forms a stepped structure, wherein an upper portion of the stepped structure comprises the plurality of coplanar IECs, and a lower portion of the stepped structure extends past the plurality of coplanar IECs.

18 Claims, 11 Drawing Sheets

(56) References Cited

U.S. PATENT DOCUMENTS

| | | | |
|---|---|---|---|
| 5,084,895 A * | 1/1992 | Shimada | G02B 6/4204 372/50.23 |
| 6,810,190 B2 * | 10/2004 | Manolatou | G02B 6/1228 385/33 |
| 7,352,940 B2 * | 4/2008 | Charters | G02B 6/122 385/33 |
| 7,643,710 B1 | 1/2010 | Liu | |
| 8,319,237 B2 | 11/2012 | Liu | |
| 9,229,169 B2 | 1/2016 | Doany et al. | |
| 9,664,858 B2 | 5/2017 | Mohammed et al. | |
| 9,698,564 B1 | 7/2017 | Shubin et al. | |
| 9,971,089 B2 | 5/2018 | Zhang et al. | |
| 2002/0034834 A1 | 3/2002 | Verdiell | |
| 2002/0197010 A1 | 12/2002 | Kato et al. | |
| 2004/0028371 A1 * | 2/2004 | Ota | G02B 6/425 385/146 |
| 2004/0173862 A1 * | 9/2004 | Oohara | G02B 6/4249 257/432 |
| 2005/0048409 A1 | 3/2005 | Elqaq et al. | |
| 2005/0105853 A1 | 5/2005 | Liu et al. | |
| 2005/0175306 A1 | 8/2005 | Chong et al. | |
| 2005/0271326 A1 * | 12/2005 | Luo | G02B 6/12004 385/39 |
| 2008/0252620 A1 | 10/2008 | Shimizu | |
| 2010/0007633 A1 | 1/2010 | Juni | |
| 2013/0279844 A1 | 10/2013 | Na et al. | |
| 2015/0362739 A1 | 12/2015 | Zambuto et al. | |
| 2016/0139338 A1 | 5/2016 | Sheu | |
| 2019/0172821 A1 | 6/2019 | Yim | |
| 2019/0339466 A1 | 11/2019 | Heck et al. | |
| 2022/0413210 A1 * | 12/2022 | Liu | G02B 6/12004 |
| 2022/0413214 A1 * | 12/2022 | Liu | G02B 6/425 |

OTHER PUBLICATIONS

Extended European Search Report for European Patent Application No. 22164505.4, dated Nov. 4, 2022.

Minot, M., et al., "A New Guided-Wave Lens Structure", Journal of Lightwave Technology, Dec. 8, 1990, vol. 8, No. 12, New York, USA.

Notice of Allowance from European Patent Application No. 22162068.5 notified Apr. 4, 2024, 8 pgs.

Carroll, L. et al., "Photonic Packaging: Transforming Silicon Photonic Integrated Circuits into Photonic Devices", Applied Sciences 2016, vol. 6, No. 426, www.mdpi.com/journal/applsci, 21 pages.

Marchetti, R. et al., "Coupling strategies for silicon photonics integrated chips", Photonics Research, vol. 7, No. 2, pp. 201-239 (2019).

Mu, X. et al., "Edge Couplers in Silicon Photonic Integrated Circuits: A Review", Applied Sciences 2020, vol. 10, No. 1538, 29 pages.

Vivien, L. et al., "Off-Chip Coupling from: Handbook of Silicon Photonics", CRC Press; https://www.routledgehandbooks.com/doi/10.1201/b14668-4; published online on: Apr. 26, 2013.

* cited by examiner

DEVICE, METHOD AND SYSTEM FOR OPTICAL COMMUNICATION WITH A WAVEGUIDE STRUCTURE AND AN INTEGRATED OPTICAL COUPLER OF A PHOTONIC INTEGRATED CIRCUIT CHIP

RELATED APPLICATIONS

This patent application is related to concurrently filed U.S. patent application Ser. TBD, titled "DEVICE, METHOD AND SYSTEM FOR OPTICAL COMMUNICATION WITH A PHOTONIC INTEGRATED CIRCUIT CHIP AND A TRANSVERSE ORIENTED LENS STRUCTURE," filed on Jun. 25, 2021, which is assigned to the assignee of the presently claimed subject matter and herein incorporated by reference.

BACKGROUND

1. Technical Field

This disclosure generally relates to photonic devices and more particularly, but not exclusively, to structures which facilitate optically coupling of a waveguide structure to an edge-wise oriented lens formed by a photonic integrated circuit chip.

2. Background Art

In optical communications, information is transmitted by way of an optical carrier whose frequency typically is in the visible or near-infrared region of the electromagnetic spectrum. A carrier with such a high frequency is sometimes referred to as an optical signal, an optical carrier, or a lightwave signal. A typical optical communication network includes several optical fibers, each of which may include several channels. A channel is a specified frequency band of an electromagnetic signal, and is sometimes referred to as a wavelength.

Technological advances today include optical communication at the level of a photonic integrated circuit (PIC) chip. This is because PICs have size advantages that are attractive in computer systems. Optical photonics devices such as lasers, modulators, and detectors are typically fabricated on silicon-on-insulator (SOI) wafers which are subsequently singulated to form PIC chips. Silicon waveguides of a PIC chip are typically designed with submicron cross-sections, allowing dense integration of active and passive devices to achieve higher speed and lower driving power. A grating structure typically serves as an optical mode converter (OMC) to provide optical coupling between a silicon waveguide of a PIC chip and an optical fiber.

As successive generations of semiconductor technologies continue to scale in terms of size, as well as speed and other capabilities, there is expected to be an increasing premium placed on improvements to techniques for providing optical signal communication between different devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
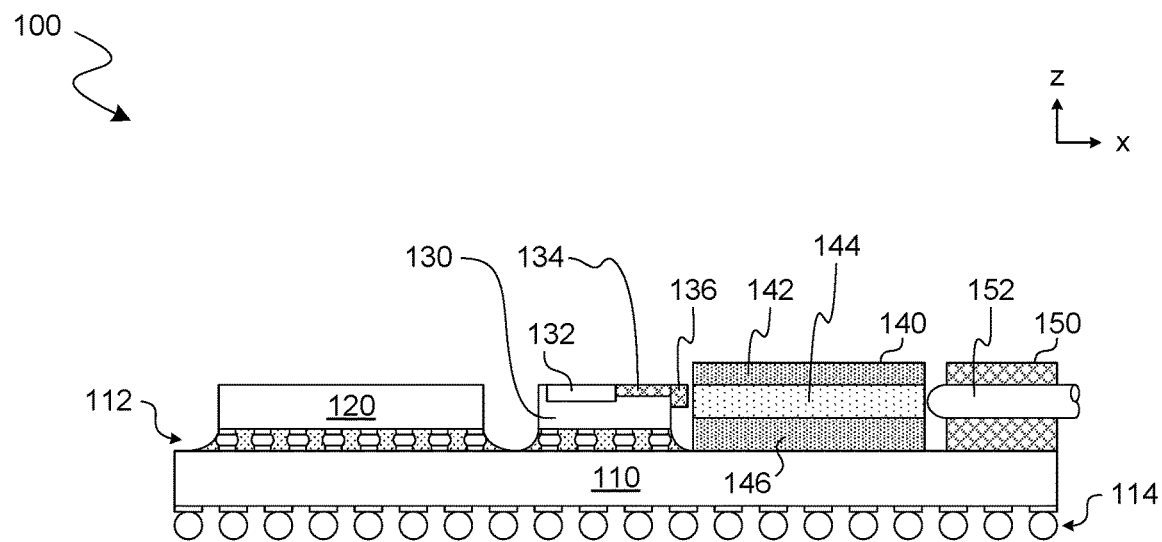
FIG. 1A shows a cross-sectional side view of a packaged device comprising a photonic integrated circuit (PIC) according to an embodiment.

Embodiments discussed herein variously provide techniques and mechanisms for coupling a lens structure of a photonic integrated circuit (PIC) chip to an optical fiber via a waveguide which is distinct from the PIC. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a PIC which is coupled to a substrate to accommodate optical coupling, via a waveguide, between an optical fiber and a cylindrical lens formed at an edge of the PIC.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Embodiments described herein variously facilitate the provisioning of an assembly which comprises a substrate and a photonic integrated circuit (PIC) chip coupled thereto, wherein an optical waveguide structure is adjacent and optically coupled to photonic structures formed by the PIC chip. More particularly, the PIC chip forms one or more integrated optical structures—referred to herein as integrated edge-oriented couplers (IECs)— which are configured to be optically coupled for horizontal signal communication with the optical waveguide structure. In this particular context, "horizontal" refers to a direction in parallel with a plane in which one of two opposite sides of a PIC chip extends (e.g., wherein an edge of the PIC chip extends between the two sides). In various embodiments, an arrangement of the optical waveguide structure and one or more IECs facilitates the communication of an optical signal—in a direction parallel to a side of the PIC chip—between an IEC and a corresponding optical fiber. In various embodiments, a planar optical waveguide structure enables beam expansion, mode conversion, and/or other functionality to facilitate photonic signal communication between IECs of a PIC chip and another device (such as a fiber array) which is optically coupled to said PIC chip.

In providing such an assembly, some embodiments variously improve the ease, efficiency and accuracy with which a PIC chip is optically coupled to an array of optical fibers (and/or to another PIC chip, for example). Additionally or alternatively, such embodiments efficiently provide a low (z-dimension) profile solution for communicating optical signals to and/or from a packaged device.

Certain features of various embodiments are described herein with reference to an assembly comprising a PIC chip, and a preformed optical waveguide structure (referred to herein as an "waveguide preform") which are variously adhered, connected or otherwise coupled—directly or indirectly—each to a substrate. The PIC chip and the optical waveguide preform are distinct from each other, and extend over different respective regions of a package substrate (or other suitable substrate).

In other embodiments, a PIC chip comprises both a plurality of IECs and an integrated optical waveguide structure which is optically coupled to said plurality of IECs. In one such embodiment, a PIC chip is of a silicon on insulator (SOI) type—e.g., comprising an upper layer of a semiconductor material, an underlayer which, for example, comprises the same (or another) semiconductor material, and a layer of a buried oxide between the upper layer and the underlayer. The upper layer comprises silicon and/or the buried oxide comprises silicon dioxide, for example. By way of illustration and not limitation, the integrated optical waveguide structure is deposited, nano-imprinted and/or otherwise formed on a region of the buried oxide which, for example, was previously exposed by removal of a portion of the upper layer.

Certain features of various embodiments are described herein with reference to a given IEC of a PIC chip forming a divergent lens surface. In this particular context, "divergent" refers to the characteristic of the lens surface extending out from—e.g., as opposed to recessing into—a given edge (or other) surface of a PIC chip. In one illustrative embodiment, a divergent lens surface comprises a continuous convex surface at an edge of a PIC chip. Alternatively, a divergent lens surface comprises a plurality of discrete facets, individual ones of which are each substantially flat—e.g., over a respective transverse length and a respective longitudinal height of the lens surface. In one such embodiment, the plurality of discrete facets are "piecewise convex"—e.g., wherein corners (or other such structures) formed by said facets are variously located along the same convex curve.

Figure 1B:
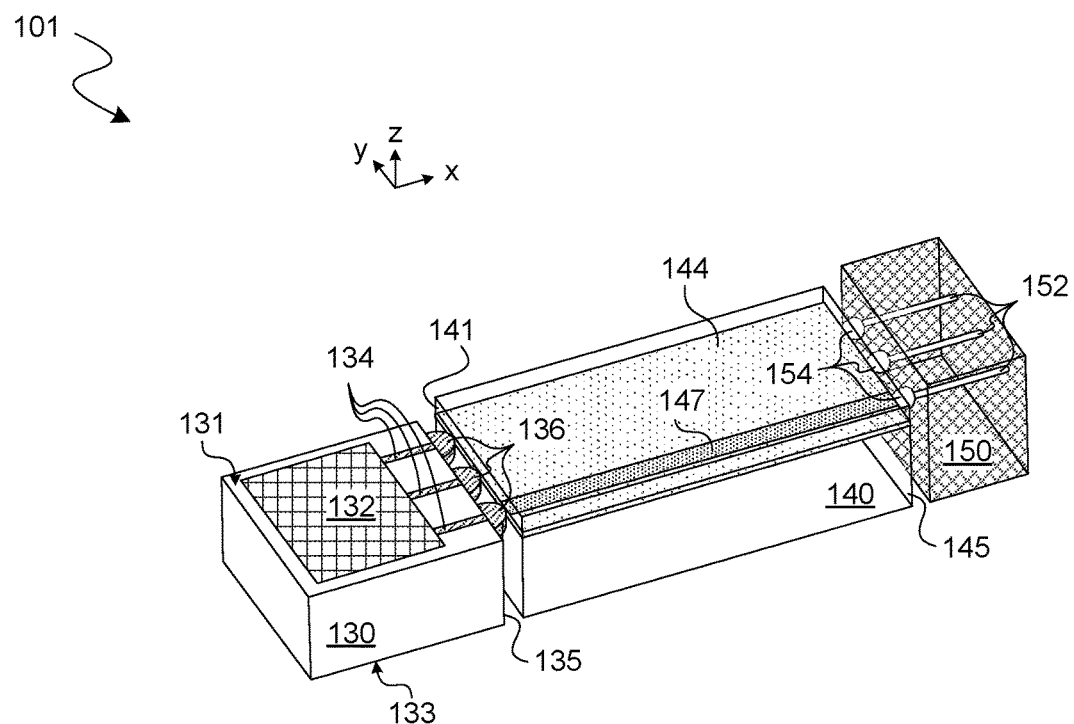
FIG. 1B shows, in a perspective view, structures of the package device represented in FIG. 1A.

FIG. 1A shows features of a device 100 to facilitate optical signal communication between a photonic integrated circuit (PIC) chip and an optical fiber according to an embodiment. FIG. 1B shows a perspective view 101 of selected structures of device 100. Device 100 illustrates one example of an embodiment wherein a PIC chip is coupled to a substrate to accommodate edge-wise optical coupling, via a waveguide structure (in this case, a waveguide preform), to one or more optical fibers.

As variously shown in FIGS. 1A, 1B, device 100 comprises a substrate 110 and a PIC chip 130 coupled thereto. Substrate 110 comprises any of various organic, glass, silicon or other suitable substrate materials that (for example) are adapted from conventional packaging techniques. In one such embodiment, substrate 110 functions as a package substrate which is to provide support for PIC chip 130, an optical waveguide structure, and (for example) one or more other integrated circuit (IC) chips—e.g., including the illustrative IC chip 120 shown. By way of illustration and not limitation, PIC 130 and IC chip 120 are variously coupled to the substrate 110 via respective ones of conductive contacts 112, which (for example) are disposed in any of various suitable underfill materials. The conductive contacts 112 comprise any type of structure and materials—whether disposed in multiple layers or combined to form one or more alloys and/or one or more intermetallic compounds—capable of providing electrical communication between substrate 110 and one or more chips including (in this example embodiment) IC chip 120 and PIC chip 130. For example, conductive contacts 112 include copper, aluminum, gold, silver, nickel, titanium, tungsten, as well as any combination of these and/or other metals.

In an embodiment, each of conductive contacts 112 (e.g., a pad, bump, stud bump, column, pillar, or other suitable structure or combination of structures) couples to a corresponding electrically conductive terminal (e.g., a pad, bump, stud bump, column, pillar, or other suitable structure or combination of structures) on a respective chip. Solder (e.g., in the form of balls or bumps) is disposed on the conductive contacts 112 or on terminals of a given chip, which are then used to join PIC chip 130 (and, for example, IC chip 120) to substrate 110—e.g., using a solder reflow process. In some embodiments, the solder material comprises any one or more of tin, copper, silver, gold, lead, nickel, indium, as well as any combination of these and/or other metals. In one such embodiment, the solder also includes one or more additives and/or filler materials to alter a characteristic of the solder (e.g., to alter the reflow temperature). Of course, it should be understood that many other types of interconnects and materials are possible (e.g., wirebonds extending between substrate 110 and one of IC chip 120 or PIC chip 130). Device 100 further comprises a ball grid array 114 positioned proximate a surface of the substrate 110 to provide electrical connections with an underlying device (not shown)—e.g., a printed circuit board.

The one or more IC chips illustrated by IC chip 120 comprise (for example) any of a variety of integrated circuit devices which are suitable for a particular application, such as (but not limited to) a microprocessor, a graphics processor, a signal processor, a network processor, a chipset, etc. In one embodiment, IC chip 120 comprises a system-on-chip (SoC) comprising one or more functional units (e.g., one or more processing units, one or more graphics units, one or more communications units, one or more signal processing units, one or more security units, etc.). However, it should be understood that some disclosed embodiments are not limited to any particular type or class of functionality to be provided with IC chip 120 (or other such integrated circuitry coupled to substrate 110 and PIC chip 130).

PIC chip 130 comprises one or more optical coupler structures—e.g., including the illustrative integrated edge-oriented couplers (IECs) 136 shown—which are formed at an edge 135 of PIC chip 130. PIC 130 further comprises integrated circuitry 132 which, for example, comprises optical signal transit circuitry and/or optical signal receiver circuitry. For example, integrated circuitry 132—e.g., comprising any of a various lasers, modulators, photodetectors and/or other integrated photonics circuits—is formed on an active side 131 of PIC chip 130, wherein an opposite side 133 comprises terminals with which PIC chip 130 is to variously communicate electrical signals (for example, with IC chip 120 and/or other circuitry via substrate 110). In some embodiments, one or more optical signal transit circuits and/or one or more optical signal receiver circuits of integrated circuitry 132 are optically coupled each to a respective one of IECs 136—e.g., via a corresponding one of one or more photonic waveguides of PIC chip 130 (such as the illustrative photonic waveguides 134 shown).

In an example embodiment, a semiconductor substrate of PIC chip 130 is of a silicon on insulator (SOI) type, and comprises (for example) an upper layer of a semiconductor material comprising silicon, an underlayer of the same semiconductor material (or another semiconductor material), and a buried oxide (BOX) layer between the upper layer and the underlayer. Photonic waveguides 134 and/or IECs 136 comprise any of various materials (such as crystalline silicon) which are suitable to communicate an optical signal—e.g., wherein such materials are adapted from conventional PIC chip designs.

To facilitate edge-wise communication of one or more optical signals to and/or from PIC chip 130—i.e., via edge 135—device 100 further comprises a planar optical waveguide preform 140 which is adhered to, or otherwise coupled over, a second region of substrate 110. In an embodiment, an edge 141 of waveguide preform 140—which comprises claddings 142, 146, and a core 144 therebetween—is adjacent to IECs 136 at edge 135. In the example embodiment shown, device 100 further comprises (or facilitates coupling to) a fiber array housing 150 which has optical fibers 152 extending therein. By way of illustration and not limitation, device 100 supports coupling to a pluggable connector of an optical cable—e.g., wherein the connector includes fiber array housing 150, and wherein optical fibers 152 of the cable extend from device 100 to couple to a remote packaged, or other, device (not shown). Although some embodiments are not limited in this regard, respective distal ends of some or all of optical fibers 152 variously form (or are coupled to) lens structures 154 to facilitate optical coupling with an adjacent edge 145 of waveguide preform 140.

In various embodiments, waveguide preform 140 is formed by processing which, for example, is adapted from conventional photonics fabrication techniques. By way of illustration and not limitation, core 144 comprises any of various light transmissive materials—such as silicon nitride ($Si_3N_4$), silicon oxynitride ($SiO_xN_y$), and/or any of a various suitable doped oxides—exhibiting refractive index characteristics which facilitate optical coupling with optical fiber materials. However, it is to be appreciated that some embodiments are not limited to a particular one or more materials of waveguide preform 140, and the such materials may differ in various embodiments according to implementation-specific details. As described herein, one or more surfaces of waveguide preform 140 (in some embodiments) are etched, laser ablated or otherwise shaped to form any of various recess structures therein—e.g., wherein one or more such recess structures are each to facilitate optical interfacing between waveguide preform 140 and a respective IEC or a respective optical fiber.

In some embodiments, photonic waveguides 134 are coplanar with each other—e.g., wherein the plurality of photonic waveguides 134 each extend in an x-y plane such as one at (or under) a side 131 of PIC chip 130. For example, some or all of photonic waveguides 134 are each within a thickness of material in or on a semiconductor substrate of PIC chip 130—e.g., wherein photonic waveguides 134 are within a top portion of the semiconductor substrate. In one such embodiment, some or all of IECs 136 are coplanar with each other—e.g., wherein IECs 136 each extend in an x-y plane such as one at (or under) side 131.

IECs 136 each terminate a respective one of photonic waveguides 134, and each form a respective lens surface that is divergent (in a y-z plane) and, in some embodiments, is substantially flat (in a x-y plane) over at least a thickness of the semiconductor substrate of PIC chip 130. For example, IECs 136 are each substantially flat at side 131, in some embodiments.

In the example embodiment shown, IECs 136 variously extend from an otherwise flat (in an y-z plane) side 135—e.g., wherein IECs 136 form a portion of edge 135 which is positioned farthest along the x-axis in the direction of waveguide preform 140. In an alternative embodiment, edge 135 forms a stepped structure, wherein an upper (along the z-axis) portion of the stepped structure comprises IECs 136, and wherein a lower (along the z-axis) portion of the stepped structure extends past IECs 136—e.g., by at least as much as a (x-axis) depth of a curvature of one of IECs 136— to provide mechanical support for an overlapping portion of waveguide preform 140

In some embodiments, a given one of IECs 136 forms a convex lens surface which is substantially semicylindrical—e.g., wherein a curvature of the convex lens surface is symmetrical about a primary axis (along the x-dimension) of the convex lens surface. In one such embodiment, the primary axis of the given convex lens surface is in a lateral (y-axis) alignment with an optical axis of a corresponding one of the photonic waveguides 134—e.g., wherein a radius of curvature of the given convex lens surface is equal to or larger than one half of a (y-axis) width of the corresponding photonic waveguide.

Additionally or alternatively, a divergent lens surface of one of IECs 136 comprises a plurality of discrete diffractive edge facets which are symmetrically distributed about a primary axis of said divergent lens surface. In one such embodiment, individual ones of the edge facets are substantially flat over a transverse (y-axis) length and a longitudinal (z-axis) height of the lens surface.

In some embodiments, one or more divergent lens surfaces of IECs 136 each extend into a semiconductor substrate of PIC chip 130. By way of illustration and not limitation, photonic waveguides 134 and IECs 136 each comprise a material including silicon. In one such embodiment, the semiconductor substrate of PIC chip 130 is of a silicon-on-insulator (SOI) type—e.g., wherein PIC chip 130 comprises a layer of silicon dioxide between the material and an underlayer. For example, one or more divergent lens surfaces of IECs 136 each stop at, or within, the layer of silicon dioxide. Additionally or alternatively, one or more divergent lens surfaces of IECs 136 each extend at least partially through the underlayer.

In the example embodiment shown, core 144 forms a portion of edge 141 which is substantially flat (for example, in a y-z plane) across some or all of IECs 136. In some alternative embodiments, edge 141 forms one or more surface recesses which are each to at least partially receive or otherwise interface with a corresponding one of IECs 136. For example, in one such embodiment, some or all of said surface recesses each have a respective profile which is complementary to the profile of a divergent lens surface formed by a corresponding one of IECs 136. By way of illustration and not limitation, one or more divergent lens surfaces of IECs 136 are each semicylindrical and convex, where one or more surface recesses at edge 141 each comprises a concave semicylinder. Some or all recesses formed at edge 141, in some embodiments, extend through an entire (z-axis) thickness of core 144 and of cladding 146. Additionally or alternatively, some or all such recesses at edge 141 each form a respective surface which is substantially flat (in a x-y plane) over at least a partial thickness of core 144.

In the example embodiment shown, another edge 145 of waveguide preform 140—the edge 145 opposite edge 141—is substantially flat (for example, in a y-z plane) across some or all of IECs 136. In some other embodiments, edge 145 alternatively forms one or more surface recesses which are each to at least partially receive or otherwise interface with a corresponding one of optical fibers 152 (for example, to a corresponding one of lens structures 154). For example, in one such embodiment, edge 145 forms one or more substantially semispherical recesses, wherein core 144 optically couples individual ones of IECs 136 each to a corresponding one of said one or more semispherical recesses. For example, fiber array housing 150 is connected to, adhered to and/or otherwise disposed over a third region of substrate 110, wherein individual ones of optical fibers 152 (and, for example, individual ones of lens structures 154) are to be received by, or otherwise optically coupled to, individual ones of the second plurality of concave lens surfaces.

Although FIGS. 1A, 1B show device 100 as providing optical coupling between IECs 136 of PIC chip 130 and optical fibers 152, it is to be appreciated that planar optical waveguide preform 140 (or any of various other planar optical waveguide structures having features described herein) additionally or alternatively supports optical coupling between IECs of a PIC chip, and any of various other external photonic devices (such as another PIC chip), in different embodiments. For example, some embodiments are variously provided entirely by a PIC chip, or entirely by a packaged device which includes such a PIC chip (e.g., independent of whether a PIC chip of said packaged device is optically coupled to another device via a planar optical waveguide structure of said packaged device).

Figure 2:
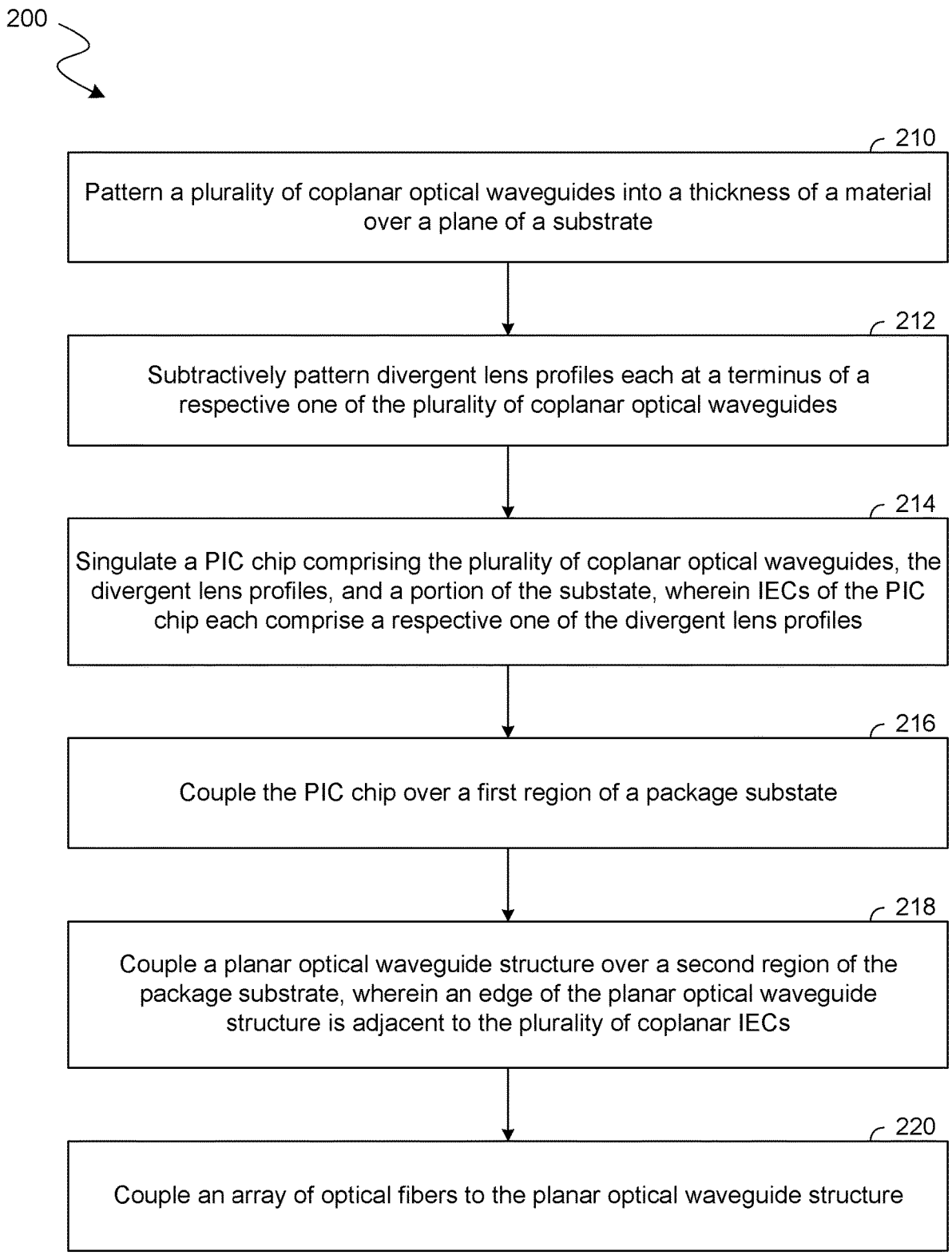
FIG. 2 shows features of a method to facilitate optical coupling between a PIC chip and a waveguide according to an embodiment.

FIG. 2 shows features of a method 200 to facilitate optical coupling of a PIC chip to a waveguide according to an embodiment. Operations such as those of method 200 are performed, for example, to provide structures of device 100.

As shown in FIG. 2, method 200 comprises (at 210) patterning a plurality of coplanar optical waveguides into a thickness of a material over a plane of a substrate. In one illustrative embodiment, a silicon-on-insulator (SOI) substrate comprises an upper layer, an underlayer, and a buried dielectric (e.g. oxide) layer disposed therebetween. The upper layer (and, in some embodiments, the underlayer) comprises crystalline silicon and/or any of various other materials suitable to communicate an optical signal. In one such embodiment, the upper layer is then etched and/or otherwise patterned to form one or more rib waveguide structures therein or thereon. The patterning at 210 involves, for example, wet or dry etching techniques, any of various lithographic processes, or other patterning processes such as ablation, ruling, or other techniques which will be apparent to those skilled in the art.

Method 200 further comprises (at 212) subtractively patterning divergent lens profiles each at a terminus of a respective one of the plurality of coplanar optical waveguides. By way of illustration and not limitation, the subtractive patterning comprises deposition of a patterned mask over a region of the substrate where the plurality of coplanar optical waveguides are to end (and, for example, where an edge of a PIC chip is to be subsequently formed). Subsequently, deep reactive ion etching (DRIE) and/or other suitable etch processing is performed through the patterned mask to form one or more lens structures. In some embodiments the patterning at 210 is performed concurrently with the subtractive patterning at 212.

Method 200 further comprises (at 214) singulating a photonic integrated circuit (PIC) chip comprising the plurality of coplanar optical waveguides, the divergent lens profiles, and a portion of the substrate. For example, the singulating at 214 comprises dicing a semiconductor wafer to form the edges of the PIC chip, wherein one such edge comprises integrated edge-oriented couplers (IECs) which each include a respective lens structure formed at 212. In some embodiments, method 200 additionally or alternatively comprises operations (not shown) to form a planar optical waveguide structure which is integrated on the substrate—e.g., wherein a core of the planar optical waveguide structure is adjacent to (and optically coupled with) the IECs, and wherein the planar optical waveguide structure is integrated with, and extends to an edge of, the singulated PIC chip.

Method 200 further comprises (at 216) coupling the PIC chip over a first region of a package substrate—e.g., wherein such coupling comprises operations adapted from conventional flip-chip, wire bonding and/or other techniques. Method 200 further comprises (at 218) coupling an optical waveguide preform over a second region of the package substrate—e.g., wherein the waveguide preform is adhered or otherwise bonded to the second region. In other embodiments, method 200 omits the coupling at 218—e.g., wherein the planar optical waveguide structure is formed as an integrated structure of the PIC chip. Method 200 further comprises (at 220) coupling an array of optical fibers to the planar optical waveguide preform. In an embodiment, the waveguide preform comprises a core, opposite ends of which are optically coupled (respectively) to the IECs and to the array of optical fibers.

Figure 3:
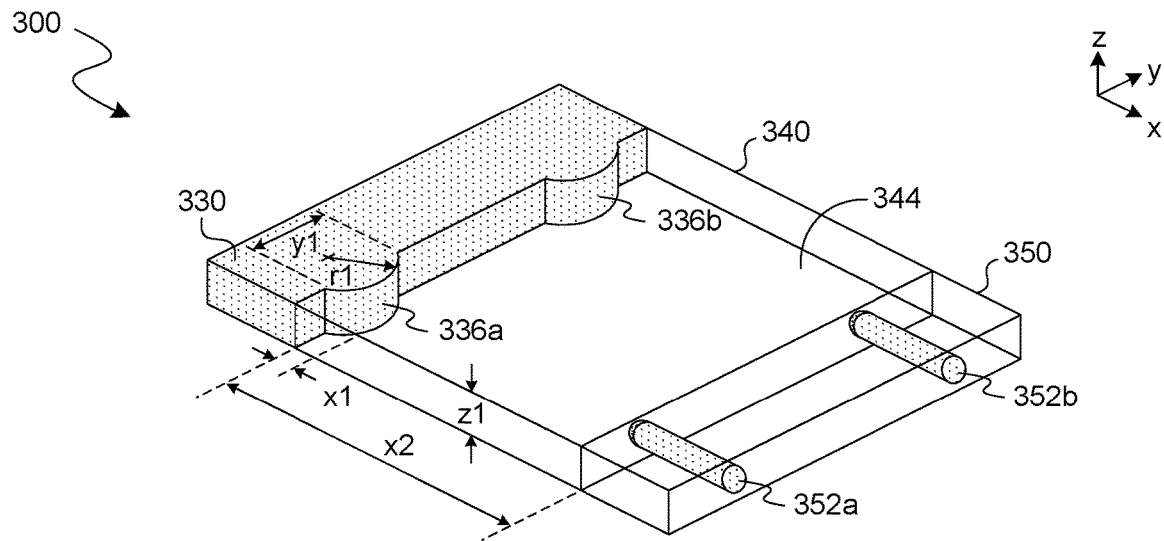
FIG. 3 shows a perspective view of an assembly to provide optical coupling between a PIC and a waveguide according to an embodiment.

FIG. 3 shows features of an assembly 300 to facilitate optical communications with a PIC chip and a waveguide according to an embodiment. In various embodiments, assembly 300 provides functionality such as that of device 100—e.g., wherein one or more operations of method 200 are to provide structures of assembly 300.

As shown in FIG. 3, assembly 300 comprises a PIC chip 330, a fiber array housing 350, and a waveguide preform 340 which are variously coupled, directly or indirectly, to a substrate (not shown) such as substrate 110. Waveguide preform 340 facilitates edge-wise communication of one or more optical signals to and/or from PIC chip—e.g., wherein a core 344 of waveguide preform 340 optically couples optical fibers 352a, 352b, in fiber array housing 350, each to a respective one of IECs 336a, 336b which are variously formed at an edge of PIC chip 330. In one such embodiment, PIC chip 330, waveguide preform 340, and fiber array housing 350 correspond functionally to PIC chip 130, waveguide preform 140, and fiber array housing 150 (respectively)—e.g., wherein IECs 336a, 336b, core 344, and optical fibers 352a, 352b correspond functionally to IECs 136, core 144, and optical fibers 152 (respectively).

In the example embodiment shown, a length x2 of core 344, between the edge of PIC chip 330 and fiber array housing 350, is in a range of 0.5 mm to 100 mm—e.g., wherein length x2 is in a range of 1.0 mm to 50 mm (and, in some embodiments, in a range of 1.0 mm to 10 mm). In one such embodiment, an x-axis depth x1 of a curvature of IEC 336a (for example) is in a range of 3 μm to 50 μm—e.g., wherein depth x1 is in a range of 4 μm to 20 μm and, in some embodiments, in a range of 5 μm to 15 μm. By way of illustration and not limitation, a y-axis width y1 of a given one of IECs 336a, 336b is in a range of 20 μm to 200 μm (e.g., in a range of 20 μm to 100 μm and, in some embodiments, in a range of 20 μm to 50 μm). In one such embodiment, IEC 336a forms a convex surface, wherein a radius of curvature r1 of the convex surface is at least 50% of width y1 (e.g., where radius r1 is in a range of 50% to 150% of width y1).

In the example embodiment shown, core 344 has a (z-axis) thickness z1 which is the same along the length x2. For example, thickness z1 is in a range of 0.1 microns (μm) to 20 μm (e.g., in a range of 3 μm to 10 μm). In some alternative embodiments, core 344 has different thicknesses at various points along the length x2. In one such embodiment, a first end of core 344, which adjoins IECs 336a, 336b, is in a range of 3 μm to 10 μm—e.g., wherein a second end of core 344, which adjoins optical fibers 352a, 352b at fiber array housing 350, is in a range of 30 μm to 200 μm. It is appreciated that, in some embodiments, the above described ranges of values for various dimensions of assembly 300 are merely illustrative, and that some or all such ranges may differ in other embodiments, according to implementation-specific details.

Figures 4A, 4B:
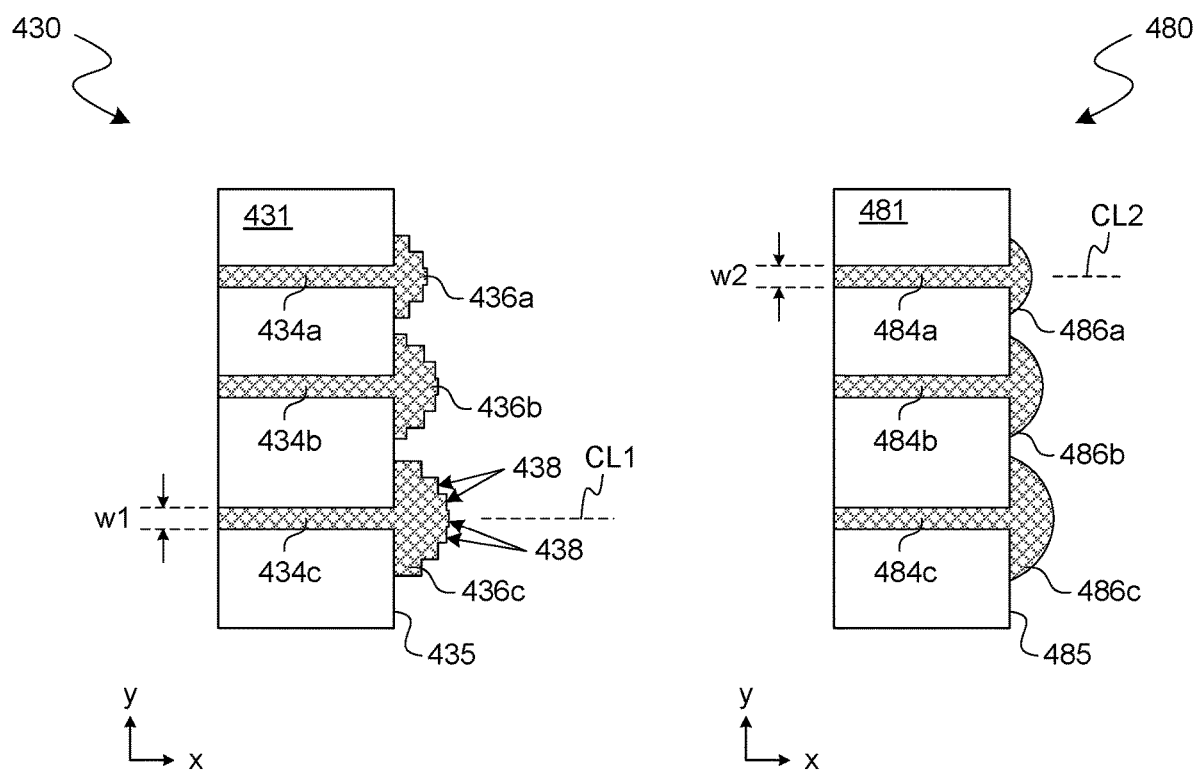
FIGS. 4A, 4B show features of respective PICs each according to a corresponding embodiment.

FIGS. 4A, 4B show features of respective PIC chips 430, 480 which are each to communicate an optical signal with a waveguide according to a corresponding embodiment. PIC chips 430, 480 variously provide functionality such as that of PIC chip 130—e.g., wherein operations of method 200 are to facilitate optical coupling of a waveguide preform with one of PIC chips 430, 480.

As shown in FIG. 4A, a surface 431 of PIC chip 430 has formed therein or thereon silicon waveguides 434a, 434b, 434c that, for example, variously extend from integrated circuitry (not shown)—e.g., including integrated photonic circuitry and, in some embodiments, integrated electrical circuitry—which is formed in or on surface 431. An edge 435 of PIC chip 430 forms the respective divergent lens surfaces of IECs 436a, 436b, 436c, which are each at a respective terminus of a corresponding one of silicon waveguides 434a, 434b, 434c. In various embodiments, PIC chip 430 provides functionality of PIC chip 130—e.g., wherein silicon waveguides 434a, 434b, 434c, edge 435, and IECs 436a, 436b, 436c correspond functionally to photonic waveguides 134, edge 135, and IECs 136 (respectively).

PIC chip 430 illustrates one embodiment wherein one or more IECs each form a respective divergent lens surface which is piecewise convex. For example, the divergent lens surface of IEC 436c comprises a plurality of discrete diffractive edge facets 438 which, in some embodiments, are symmetrically distributed about a primary axis CL1 of IEC 436c. In one such embodiment, individual ones of said edge facets 438 are each substantially flat over a transverse (y-axis) length and a longitudinal (z-axis) height of IEC 436c. Additionally or alternatively, the primary axis CL1 of IEC 436c is in a transverse (y-axis) alignment with an optical axis of the corresponding silicon waveguide 434c. In one such embodiment, the divergent lens surface of IEC 436c includes corners (or other such points) which are distributed along a semicylindrical curve, a radius of which is equal to or larger than one half of a (y-axis) width w1 of silicon waveguide 434c.

As shown in FIG. 4B, a surface 481 of PIC chip 480 has formed therein or thereon silicon waveguides 484a, 484b, 484c that, for example, variously extend from integrated circuitry (not shown) which is formed in or on surface 481. An edge 485 of PIC chip 480 forms the respective divergent lens surfaces of IECs 486a, 486b, 486c, at the respective termini of silicon waveguides 484a, 484b, 484c. In various embodiments, PIC chip 480 provides functionality of PIC chip 130—e.g., wherein silicon waveguides 484a, 484b, 484c, edge 485, and IECs 486a, 486b, 486c correspond functionally to photonic waveguides 134, edge 135, and IECs 136 (respectively).

PIC chip 480 illustrates one embodiment wherein one or more IECs each form a respective convex lens surface. For example, IEC 486a forms a convex lens surface which is symmetrical about a primary axis CL2. In one such embodiment, the primary axis CL2 of IEC 486a is in a transverse (y-axis) alignment with an optical axis of the corresponding silicon waveguide 484a. Additionally or alternatively, the convex surface of IEC 486a conforms to a semicylindrical curve, a radius of which is equal to or larger than one half of a (y-axis) width w2 of silicon waveguide 484a.

Figure 5A:
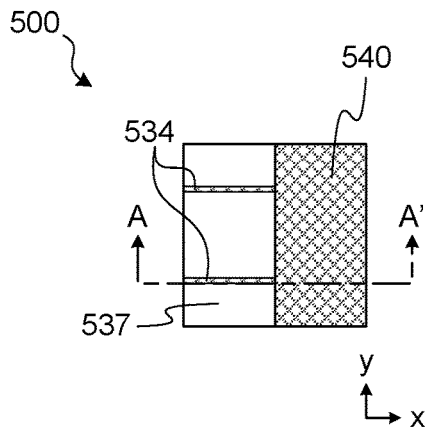
FIGS. 5A through 5F show cross-sectional views each of a respective stage of processing to provide cylindrical lenses of a PIC according to an embodiment.
Figure 5B:
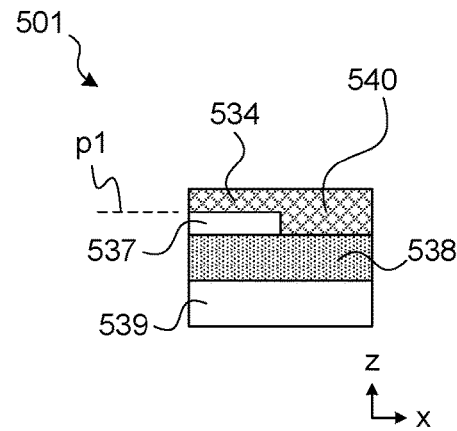
Figure 5C:
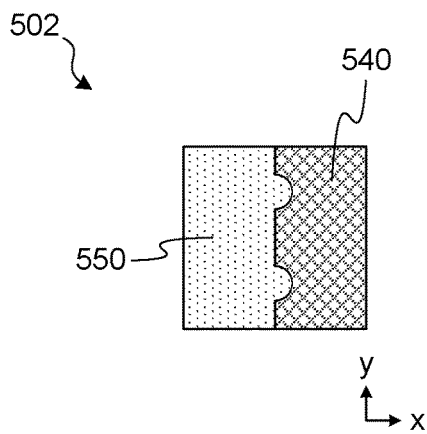
Figure 5D:
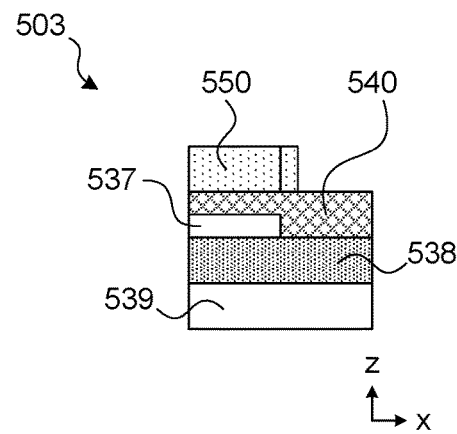
Figure 5E:
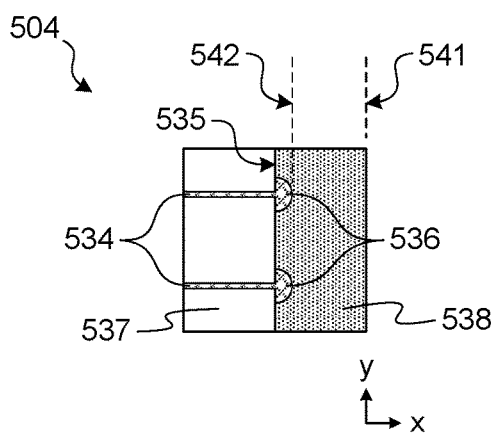
Figure 5F:
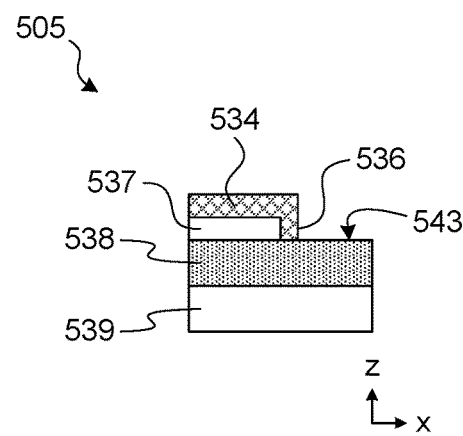

FIGS. 5A, 5C, 5E show various structures during respective stages 500, 502, 504 of processing to fabricate IECs of a PIC chip according to an embodiment. Processing such as that illustrated by stages 500, 502, 504 is performed, for example, to provide structures of one of PIC chips 130, 330, 430, or 480—e.g., wherein operations of method 200 include or are otherwise based on some or all such processing. The various structures in stages 500, 502, 504 are also shown by the respective cross-sectional side views 501, 503, 505 in FIGS. 5B, 5D, 5F (respectively). The cross-sections for side views 501, 503, 505 correspond to the line A-A' shown.

As shown in FIG. 5A, structures at stage 500 are formed by processing of a SOI wafer which comprises an underlayer 539 of a semiconductor material, an insulator layer 538 comprising any of various suitable dielectric materials (such as $SiO_2$) over underlayer 539, and an upper layer 537 of a material which (for example) comprises silicon. Some or all of upper layer 537 (and, in some embodiments, the underlayer 539) comprises crystalline silicon and/or any of various other materials suitable to communicate an optical signal.

At stage 500, photonic waveguide structures (such as the illustrative silicon waveguides 534 shown) are formed in or on layer 537—e.g., where such forming includes any of various suitable wet or dry etching techniques, any of various lithographic processes, or other patterning processes such as ablation, ruling, or the like. In one such embodiment, silicon waveguides 534 are rib waveguide structures formed by patterned etching of crystalline silicon in a material layer above a horizontal (x-y) plane p1 which extends in or on layer 537. Silicon waveguides 534 variously extend to a body of a material 540 which (for example) comprises crystalline silicon or any of various other materials which are suitable to communicate an optical signal. At stage 500 (or alternatively, at a later processing stage), silicon waveguides 534 further extend variously between material 540 and integrated circuitry (not shown)—e.g., including integrated photonic circuitry and, in some embodiments, integrated electrical circuitry—which is formed in or on layer 537. In various embodiments, material 540 has a same composition as a material of silicon waveguides 534.

As shown in FIG. 5C, a patterned mask 550 is formed at stage 502 on structures which are variously formed in or on layer 537—e.g., the structures including silicon waveguides 534, and portions of material 540. In an embodiment, some portions of patterned mask 550—which extend over material 540—comprise various concave or otherwise divergent profiles, which are to facilitate the formation of IEC structures.

As shown in FIG. 5E, structures at stage 504 are formed by an etch process, after which the patterned mask 550 is removed from silicon waveguides 534 and/or from other structures which are formed in or on layer 537. In some embodiments, the etch process—e.g., comprising deep reactive ion etching (DRIE)— selectively removes portions of material 540, wherein remaining portions of material 540 form IECs 536 which are at an edge portion of layer 537, and which are each at a respective termini of a corresponding one of silicon waveguides 534.

In this example embodiment, IECs 536 extend vertically to insulator layer 538—e.g., wherein the etch process exposes a surface 543 of insulator layer 538 (for example). IECs 536 forms one or more divergent lens profiles, wherein a maximum horizontal (x-axis) extent of said lens profiles is indicated by the vertical plane 542 (i.e., an y-z plane) shown. In various embodiments, subsequent singulation forms a PIC chip which comprises the structures shown in view 505. For example, an edge of the singulated PIC chip forms a stepped structure comprising an upper portion and a lower portion. In one such embodiment, the upper portion, which is above surface 543, comprises the respective divergent lens profiles of IECs 536—e.g., wherein the lower portion is below surface 543, and extends horizontally past vertical plane 542 to another vertical plane 541. As described herein, the lower portion provides support for, and/or facilitates alignment with, a waveguide preform that is to be optically coupled with IECs 536, in some embodiments.

Figure 6A:
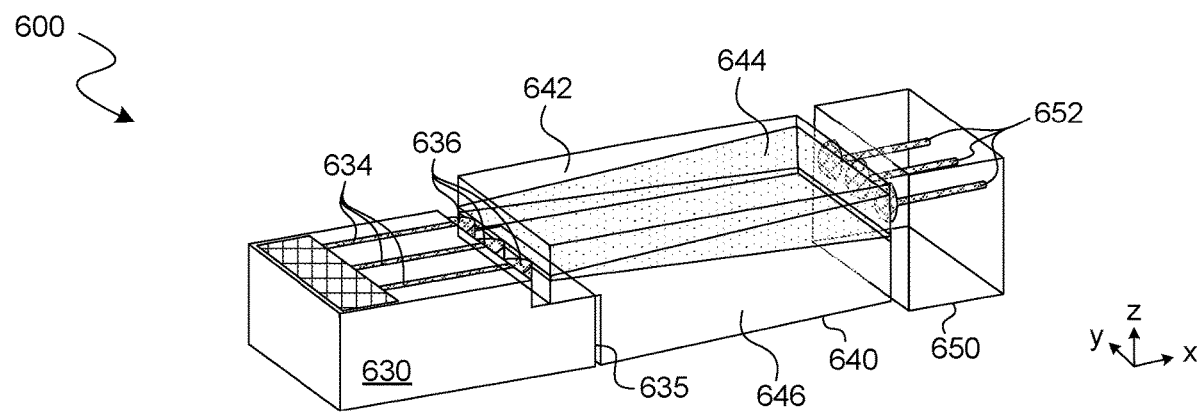
FIGS. 6A through 6C show respective views each of a respective assembly to optically couple a PIC and waveguide according to a corresponding embodiment.
Figure 6B:
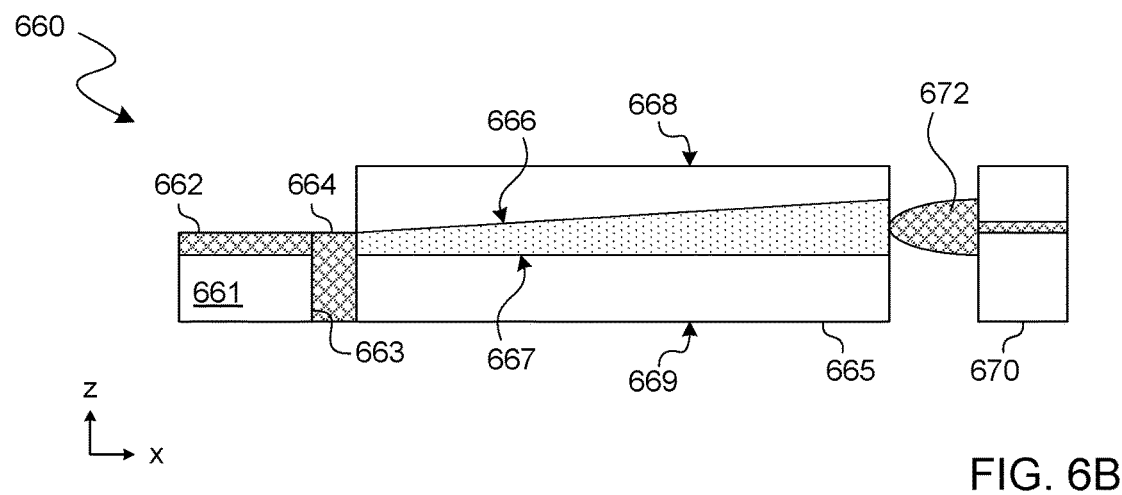
Figure 6C:
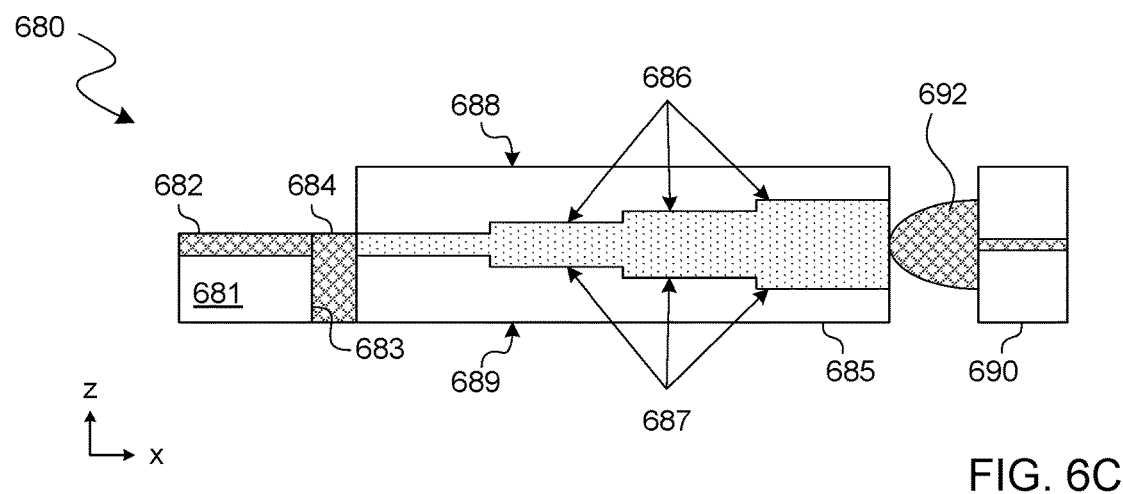

FIGS. 6A through 6C show features of respective assemblies 600, 660, 680 each to facilitate optical communications with a respective waveguide according to a corresponding embodiment. Assemblies 600, 660, 680 variously illustrate embodiments wherein a (z-axis) thickness of a waveguide core increases along a distance from IECs of a PIC chip to one or more optical fibers which are optically coupled thereto. Some or all of assemblies 600, 660, 680 each provide respective functionality of device 100, or assembly 300 (for example)—e.g., wherein method 200 is to provide functionality of one or more of assemblies 600, 660, 680.

As shown in FIG. 6A, assembly 600 comprises a PIC chip 630, a fiber array housing 650, and a waveguide preform 640 which optically couples optical fibers 652 (which extend in fiber array housing 650) each to a respective one of IECs 636 which are variously formed at an edge 635 of PIC chip 630. IECs 636 facilitate edge-wise communication of optical signals—via silicon waveguides 634 of PIC chip 630—between waveguide preform 640 and integrated circuitry of PIC chip 630. For example, waveguide preform 640 comprises cladding 642, cladding 646, and a core 644 which is extends therebetween, wherein a first edge of waveguide preform 640 is positioned to have one end of core 644 be adjacent to IECs 636 (which are each at a terminus of a respective one of silicon waveguides 634). A second edge of waveguide preform 640 (opposite the first edge) is positioned to have an opposite end of core 644 be adjacent to optical fibers 652 which variously extend in fiber array housing 650.

In one such embodiment, PIC chip 630, waveguide preform 640, and fiber array housing 650 correspond functionally to PIC chip 130, waveguide preform 140, and fiber array housing 150 (respectively)—e.g., wherein silicon waveguides 634, edge 635, IECs 636, cladding 642, core 644, cladding 646, and optical fibers 652 correspond functionally to photonic waveguides 134, edge 135, IECs 136, cladding 142, core 144, cladding 146, and optical fibers 152 (respectively).

In the example embodiment shown, the top and bottom surfaces of core 644 are variously inclined each with respect to a horizontal (x-y) plane in which silicon waveguides 634 variously extend. Accordingly, core 644 provides for an expansion of an optical signal during communication thereof from one of IECs 636 to a corresponding one of optical fibers 652. Alternatively or in addition, core 644 provides for an optical signal decreasing in size during communication thereof from one of optical fibers 652 to a corresponding one of IECs 636.

Additionally or alternatively, in some embodiments, edge 635 of PIC chip 630 forms a stepped structure, wherein an upper portion of the stepped structure comprises IECs 636, and a lower portion of the stepped structure extends past IECs 636. In one such embodiment, waveguide preform 640 overlaps the lower portion of said stepped structure—e.g., wherein the lower portion facilitates alignment of, and/or provides support for, at least a portion of waveguide preform 640.

As shown in FIG. 6B, assembly 660 comprises a PIC chip 661, a fiber array housing 670, and a waveguide preform 665 which optically couples optical fibers 672 (which extend in fiber array housing 670) each to a respective one of IECs 664 which are variously formed at an edge 663 of PIC chip 661. IECs 664 facilitate edge-wise communication of optical signals—via silicon waveguides 662 of PIC chip 661— between waveguide preform 665 and integrated circuitry of PIC chip 661. In one such embodiment PIC chip 661, waveguide preform 665, and fiber array housing 670 correspond functionally to PIC chip 130, waveguide preform 140, and fiber array housing 150 (respectively). In the example embodiment shown, a core of waveguide preform 665 (the core adjacent to IECs 664 and optical fibers 672) comprises a top surface 666 and a bottom surface 667, only one of which is inclined with respect to a horizontal (x-y) plane in which silicon waveguides 662 variously extend. For example, top surface 666 is inclined toward a top side 668 of waveguide preform 665, while bottom surface 667 is parallel to both top side 668 and a bottom side 669 of waveguide preform 665.

As shown in FIG. 6C, assembly 680 comprises a PIC chip 681, a fiber array housing 690, and a waveguide preform 685 which optically couples optical fibers 692 (which extend in fiber array housing 690) each to a respective one of IECs 684 which are variously formed at an edge 683 of PIC chip 681. IECs 684 facilitate communication of optical signals, via silicon waveguides 682 of PIC chip 681, between waveguide preform 685 and integrated circuitry of PIC chip 681. In one such embodiment PIC chip 681, waveguide preform 685, and fiber array housing 690 correspond functionally to PIC chip 130, waveguide preform 140, and fiber array housing 150 (respectively). In the example embodiment shown, a core of waveguide preform 685 (the core adjacent to IECs 684 and optical fibers 692) comprises a top surface 686 and a bottom surface 687, which are variously inclined step-wise in different respective vertical (z-axis) directions, along the length of waveguide 685, from IECs 684 to optical fibers 692.

Figure 7A:
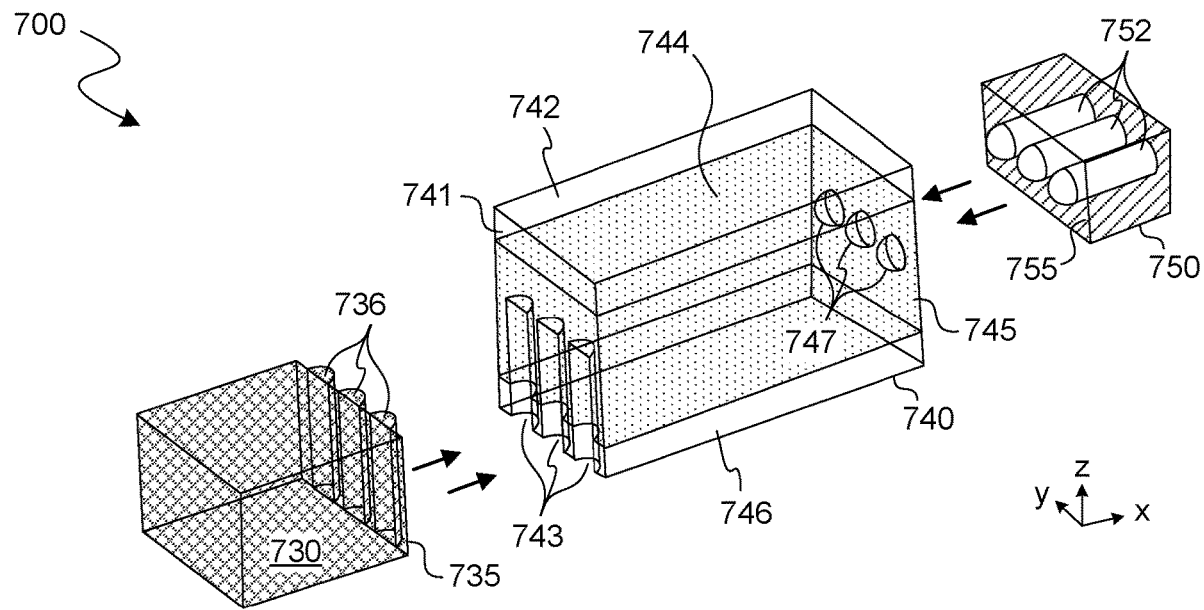
FIG. 7A shows an exploded view of an assembly to optically couple a PIC to a waveguide according to an embodiment.
Figure 7B:
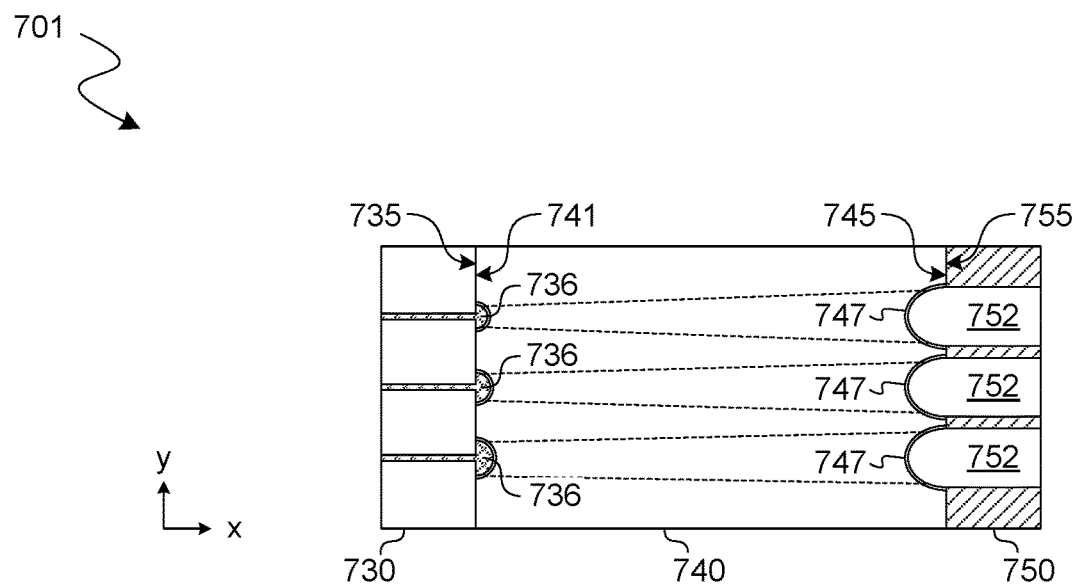
FIG. 7B shows, in a cross-sectional top view, structures of the assembly represented in FIG. 7A.

FIG. 7A shows, in an exploded view, features of an assembly 700 to communicate an optical signal with a PIC chip according to an embodiment. FIG. 7B shows a cross-sectional top view 701 of assembly 700. In various embodiments, assembly 700 includes some or all features of device 100—e.g., wherein structures of assembly 700 are provided by and/or used in operations of method 200, for example.

As shown in FIG. 7A, assembly 700 comprises a PIC chip 730, a waveguide preform 740, and a fiber array housing 750 which, for example, correspond functionally to PIC chip 130, waveguide preform 140, and fiber array housing 150 (respectively). In one such embodiment, IECs 736, which are formed by an edge 735 of PIC chip 730, facilitate edge-wise communication of optical signals between waveguide preform 740 and integrated circuitry (not shown) of PIC chip 730. For example, waveguide preform 740 comprises cladding 742, cladding 746, and a core 744 which is extends therebetween, wherein an edge 741 of waveguide preform 740 is positioned to have one end of core 744 be adjacent to edge 735. Another edge 745 of waveguide preform 740 is positioned to have an opposite end of core 744 be adjacent to an edge 755 of fiber array housing 750. In an embodiment, optical fibers 752 extending from edge 755 are optically coupled, via core 744, each to a corresponding one of IECs 736.

In the example embodiment shown, edge 741 forms recess structures 743, individual ones of which are each to receive, or otherwise interface with, a corresponding one of IECs 736. For example, individual ones of recess structures 743 each have a respective profile which is complementary to a profile of the divergent lens surface of the corresponding IEC. In some embodiments, some or all of recess structures 743 extend only partially along the (z-axis) height of edge 741—e.g., wherein individual ones of recess structures 743 each form a substantially flat, horizontal (in an x-y plane) surface over at least a partial (z-axis) thickness of core 744. In one such embodiment, a divergent lens surface formed by a given one of IECs 736 is convex and (for example) substantially semicylindrical, wherein a corresponding of recess structures 743 comprises a concave semicylinder. Additionally or alternatively, individual ones of recess structures 743 extend through the entire thickness of cladding 746 (for example).

In the example embodiment shown, the edge 745 of waveguide preform 740 (opposite edge 741) forms recess structures 747 which are each to receive or otherwise interface with a corresponding one of optical fibers 752. By way of illustration and not limitation, recess structures 747 comprise substantially hemispherical surfaces, wherein core 744 optically couples individual ones of IECs 736 to individual ones of said substantially hemispherical surfaces.

Figure 8A:
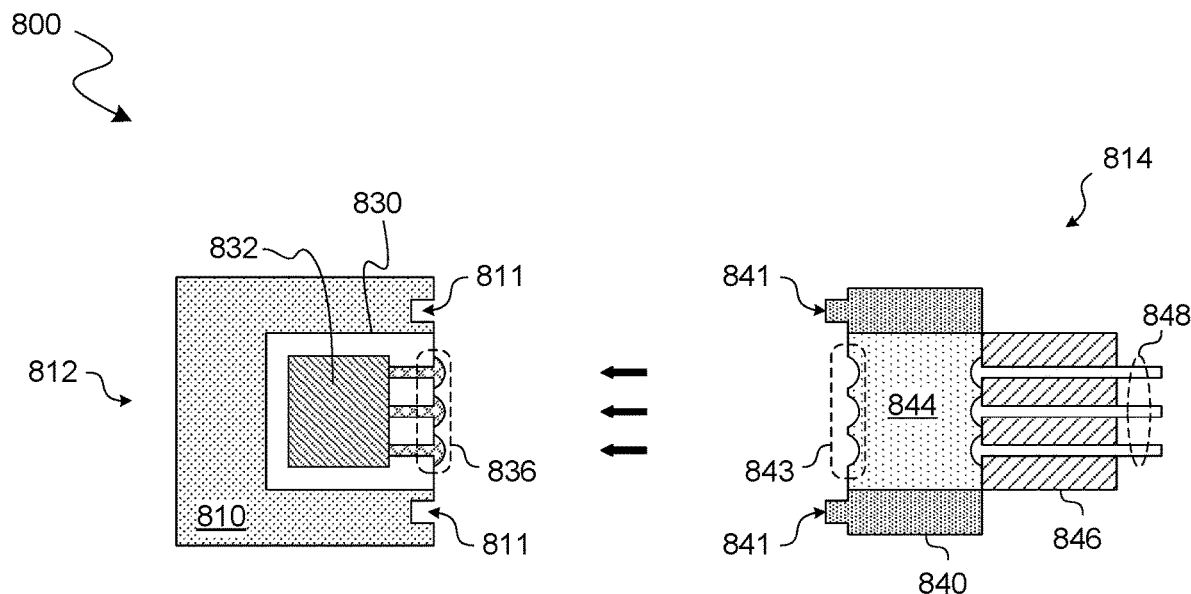
FIGS. 8A, 8B show features of respective assemblies each to optically couple a PIC to optical fibers via a waveguide according to a corresponding embodiment.
Figure 8B:
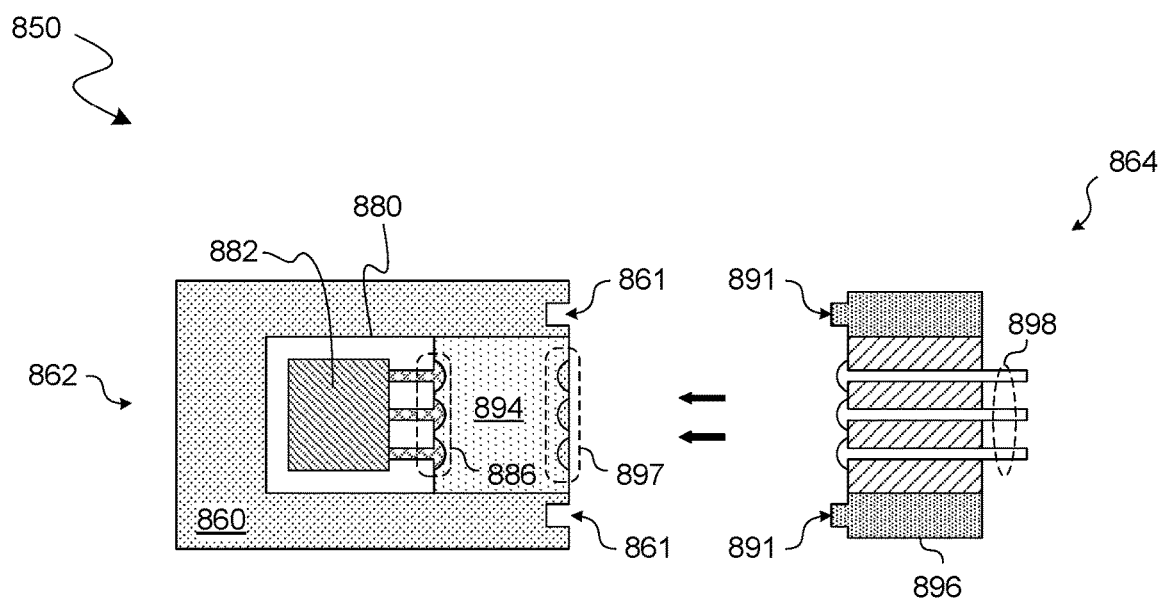

FIGS. 8A, 8B show exploded views of respective assemblies 800, 850 each to facilitate edge-wise optical signal communications with a PIC chip, and a waveguide preform according to a corresponding embodiment. One or both of assemblies 800, 850 each provide respective functionality such as that of device 100 (for example)—e.g., wherein method 200 is to provide functionality of one or more of assemblies 800, 850.

As shown in FIG. 8A, assembly 800 comprises a sub-assembly 812 and a cable 814 which (in this example) is to be pluggably connected to sub-assembly 812. Sub-assembly 812 comprises a substrate 810 and a PIC chip 830 coupled thereto. PIC chip 830 comprises integrated circuitry 832 and IECs 836 which are variously optically coupled to integrated circuitry 832 each via a respective silicon waveguide on a substrate of PIC chip 830. Furthermore, cable 814 comprises a pluggable connector 840 and a fiber array housing 846 coupled thereto—e.g., wherein optical fibers 848 in fiber array housing 846 variously extend from pluggable connector 840 to facilitate coupling of assembly 800 to another device. Pluggable connector 840 includes a waveguide preform which comprises a core 844 that is optically coupled to respective distal ends of optical fibers 848. In one such embodiment, PIC chip 830, the waveguide preform of pluggable connector 840, and fiber array housing 846 correspond functionally to PIC chip 130, waveguide preform 140, and fiber array housing 150 (respectively)—e.g., wherein integrated circuitry 832, IECs 836, core 844, and optical fibers 848 correspond functionally to integrated circuitry 132, IECs 136, core 144, and optical fibers 152 (respectively).

In the example embodiment of assembly 800, PIC chip 830 is positioned at an edge of substrate 810—e.g., wherein IECs 836 extend to (and in some embodiments, beyond) said edge of substrate 810, and wherein cable 814 includes a waveguide preform to be optically coupled to IECs 836. In various embodiments, respective alignment features of sub-assembly 812 and cable 814 facilitate efficient optical alignment of IECs 836 each with a respective one of optical fibers 848. By way of illustration and not limitation, substrate 810 and pluggable connector 840 have formed therein respective alignment features 811, 841 (e.g., comprising one or more holes, pins, posts, or other suitable structures), which are reciprocal to each other, to facilitate an optical interfacing of IECs 836 with recess structures 843 which are variously formed at a nearest side of core 844. In an alternative embodiment, alignment features 811 are formed in a package mold (not shown) or other suitable structure of sub-assembly 812 which is disposed on, under and/or around substrate 810. In some embodiments, IECs 836 and recess structures 843 are themselves additional or alternative alignment features of assembly 800—e.g., wherein each of recess structures 843 is to receive, at least in part, a corresponding one of IECs 836.

As shown in FIG. 8B, assembly 850 comprises a sub-assembly 862 and a cable 864 which (for example) is pluggably connected to sub-assembly 862. Sub-assembly 862 comprises a substrate 860 and a PIC chip 880 coupled thereto. PIC chip 880 comprises integrated circuitry 882 and IECs 886 which are variously coupled to integrated circuitry 882 each via a respective silicon waveguide on a substrate of PIC chip 880. Sub-assembly 862 further comprises a waveguide preform which includes a core 894 that is optically coupled to PIC chip 880—e.g., wherein IECs 886 are each received into a respective recess structure formed at an adjoining side of core 894. Furthermore, cable 864 comprises a pluggable connector 896, wherein optical fibers 898 of cable 864 variously extend from pluggable connector 896 to facilitate coupling of assembly 850 to another device. In one such embodiment, PIC chip 880, the waveguide preform of sub-assembly 862, and pluggable connector 896 correspond functionally to PIC chip 130, waveguide preform 140, and fiber array housing 150 (respectively)—e.g., wherein integrated circuitry 882, IECs 886, core 894, and optical fibers 898 correspond functionally to integrated circuitry 132, IECs 136, core 144, and optical fibers 152 (respectively).

In the example embodiment of assembly 850, PIC chip 880 is recessed from an edge of substrate 860—e.g., wherein core 894, which extends to said edge of substrate 860, forms recess structures 897 which are each to receive or otherwise interface with a corresponding one of optical fibers 898. In various embodiments, respective alignment features of sub-assembly 862 and cable 864 facilitate efficient optical alignment of IECs 886 each with a respective one of optical fibers 898. By way of illustration and not limitation, substrate 860 and pluggable connector 896 have formed therein respective alignment features 861, 891 (e.g., comprising one or more holes, pins, posts, or other suitable structures), which are reciprocal to each other, to facilitate an optical interfacing of recess structures 897 each with a corresponding one of optical fibers 898. In some embodiments, alignment features 861 are alternatively formed in a package mold (not shown) or other suitable structure of sub-assembly 862 which is disposed on, under and/or around substrate 860. In some embodiments, recess structures 897 and respective lens structures formed by optical fibers 898 are themselves additional or alternative alignment features of assembly 850—e.g., wherein each of recess structures 897 is to receive, at least in part, a corresponding lens structure formed by one of optical fibers 898.

Figure 9:
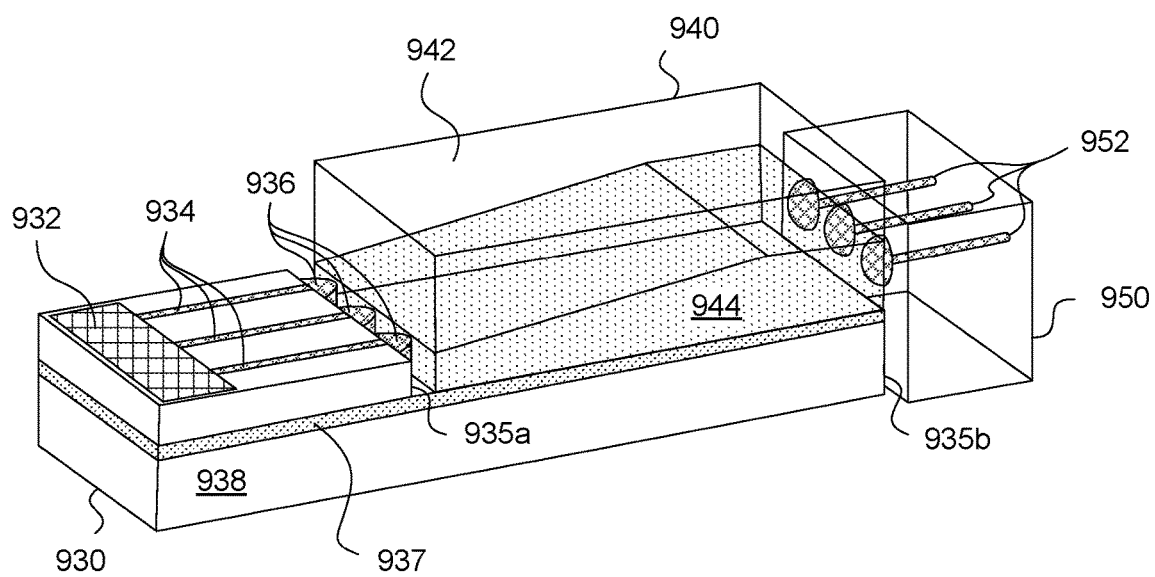
FIG. 9 shows a perspective view of an assembly to provide optical coupling between an integrated waveguide structure of a PIC and an optical fiber array according to an embodiment.

FIG. 9 show features of an assembly 900 to facilitate optical communications with a PIC chip comprising both IECs, and an integrated planar waveguide structure according to an embodiment. Assembly 900 provides functionality of device 100, or of one of assemblies 300, 600, 660, 680 (for example)—e.g., wherein method 200 is to provide functionality of assembly 900.

As shown in FIG. 9, assembly 900 comprises a PIC chip 930, and a fiber array housing 950, wherein an integrated planar waveguide structure 940 of PIC chip 930 optically couples optical fibers 952 (which extend in fiber array housing 950) each to a respective one of IECs 936 which are variously formed at a sidewall structure 935*a* of PIC chip 930. IECs 936 facilitate edge-wise communication of optical signals—via silicon waveguides 934 of PIC chip 930—between integrated planar waveguide structure 940 and integrated circuitry 932 of PIC chip 930. For example, integrated planar waveguide structure 940 comprises cladding 942, and a core 944 which is extends therebetween, wherein a first edge of integrated planar waveguide structure 940 is positioned to have one end of core 944 be adjacent to IECs 936 (which are each at a terminus of a respective one of silicon waveguides 934). An edge 935*b* of PIC chip 930 forms, or is otherwise proximate to, a second edge of integrated planar waveguide structure 940 (opposite the first edge)—wherein the second edge is positioned to have an opposite end of core 944 be adjacent to optical fibers 952. In one such embodiment, integrated planar waveguide structure 940, corresponds functionally to waveguide preform 140—e.g., wherein silicon waveguides 934, IECs 936, cladding 942, core 944, and optical fibers 952 correspond functionally to photonic waveguides 134, IECs 136, cladding 142, core 144, and optical fibers 152 (respectively).

In the example embodiment shown, PIC chip 930 is of a silicon on insulator (SOI) type—e.g., wherein integrated circuitry 932, silicon waveguides 934, and IECs 936 are variously formed in an upper layer comprising a semiconductor material. PIC 930 further comprises an underlayer 938 (of the same semiconductor material, for example), and a buried oxide layer 937 which is between the upper layer and underlayer 938. The upper layer comprises silicon and/or the buried oxide comprises silicon dioxide, for example. By way of illustration and not limitation, the core 944 of integrated optical waveguide structure 940 is deposited, nano-imprinted and/or otherwise formed on a region of the buried oxide layer 937—e.g., where such region was previously exposed by removal of a portion of the upper layer. Formation of core 944, and cladding 942 on buried oxide layer 937 includes any of various suitable operations which (for example) are adapted from conventional lithographic etch, and deposition techniques. In some embodiments, the underlying portion of buried oxide layer 937 functions as a bottom cladding beneath the core 944.

Figure 10:
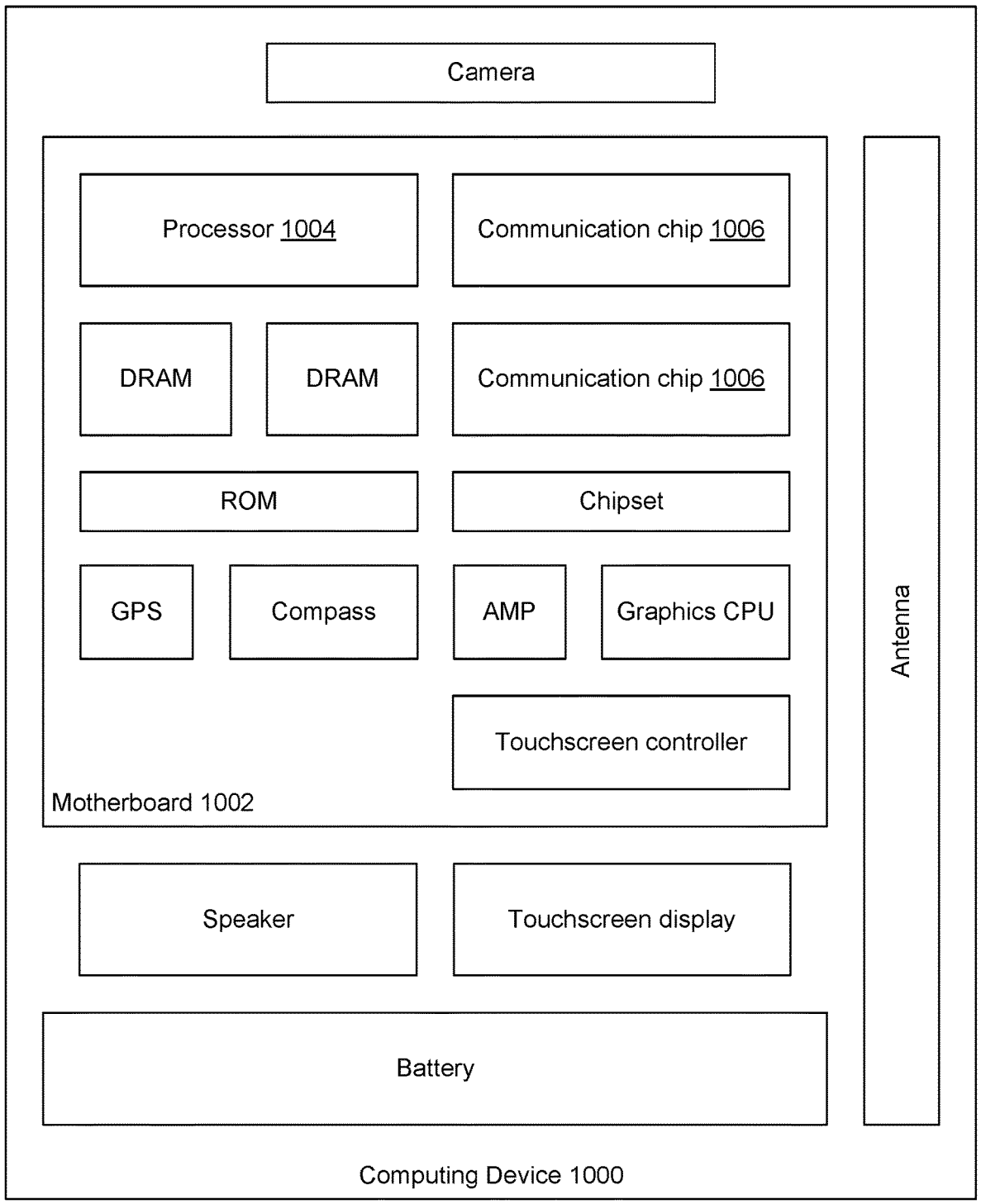
FIG. 10 is a functional block diagram illustrating a computing device in accordance with one embodiment.

FIG. 10 illustrates a computing device 1000 in accordance with one embodiment. The computing device 1000 houses a board 1002. The board 1002 may include a number of components, including but not limited to a processor 1004 and at least one communication chip 1006. The processor 1004 is physically and electrically coupled to the board 1002. In some implementations the at least one communication chip 1006 is also physically and electrically coupled to the board 1002. In further implementations, the communication chip 1006 is part of the processor 1004.

Depending on its applications, computing device 1000 may include other components that may or may not be physically and electrically coupled to the board 1002. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 1006 enables wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 of the computing device 1000 includes an integrated circuit die packaged within the processor 1004. The term "processor" may refer to any device or portion of a device that processes electronic data from registers and/or memory to transform that electronic data into other electronic data that may be stored in registers and/or memory. The communication chip 1006 also includes an integrated circuit die packaged within the communication chip 1006.

In various implementations, the computing device 1000 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 1000 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 11:
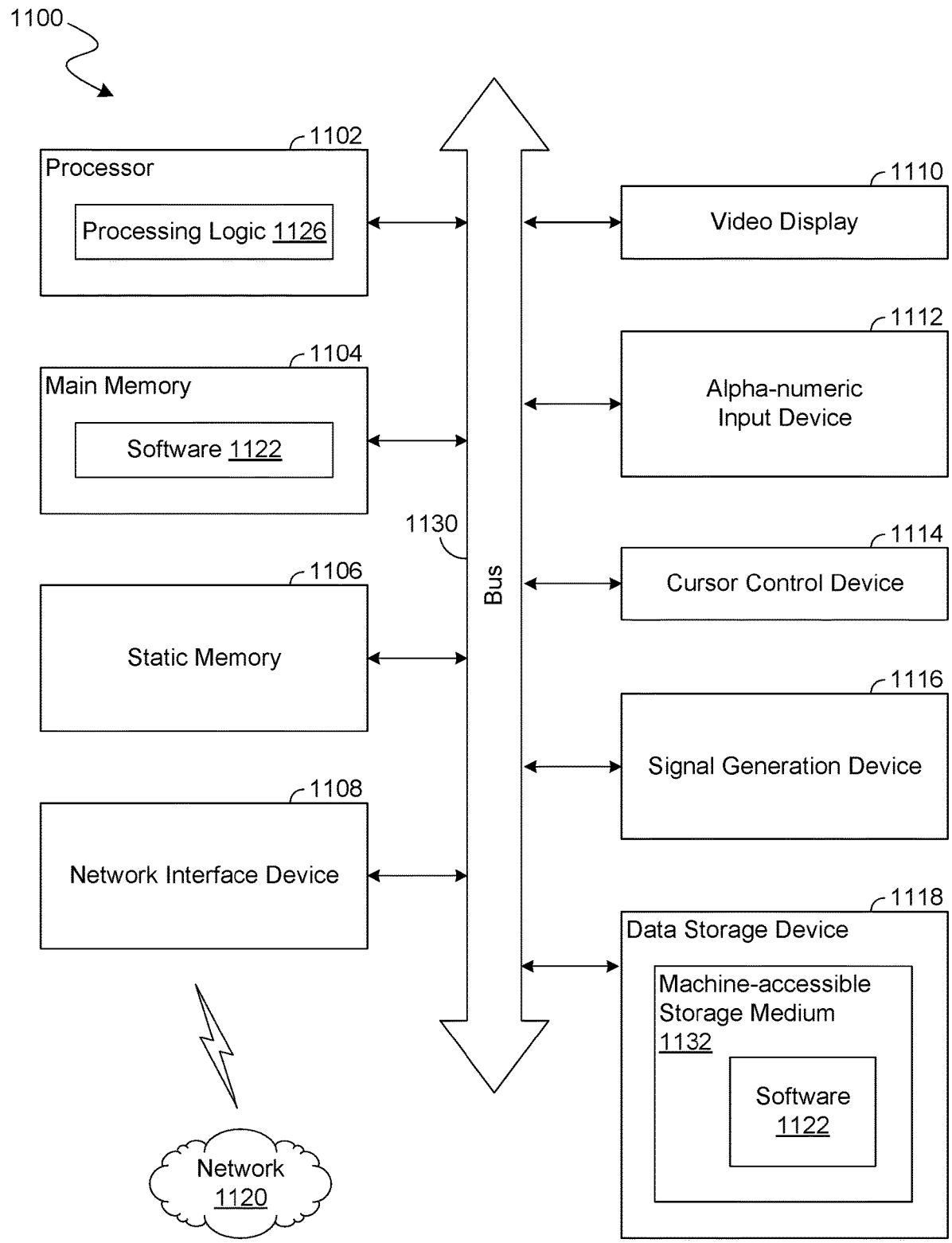
FIG. 11 is a functional block diagram illustrating an exemplary computer system, in accordance with one embodiment.

FIG. 11 illustrates a diagrammatic representation of a machine in the exemplary form of a computer system 1100 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1118 (e.g., a data storage device), which communicate with each other via a bus 1130.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations described herein.

The computer system 1100 may further include a network interface device 1108. The computer system 1100 also may include a video display unit 1110 (e.g., a liquid crystal display (LCD), a light emitting diode display (LED), or a cathode ray tube (CRT)), an alphanumeric input device 1112 (e.g., a keyboard), a cursor control device 1114 (e.g., a mouse), and a signal generation device 1116 (e.g., a speaker).

The secondary memory 1118 may include a machine-accessible storage medium (or more specifically a computer-readable storage medium) 1132 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface device 1108.

While the machine-accessible storage medium 1132 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Figure 12:
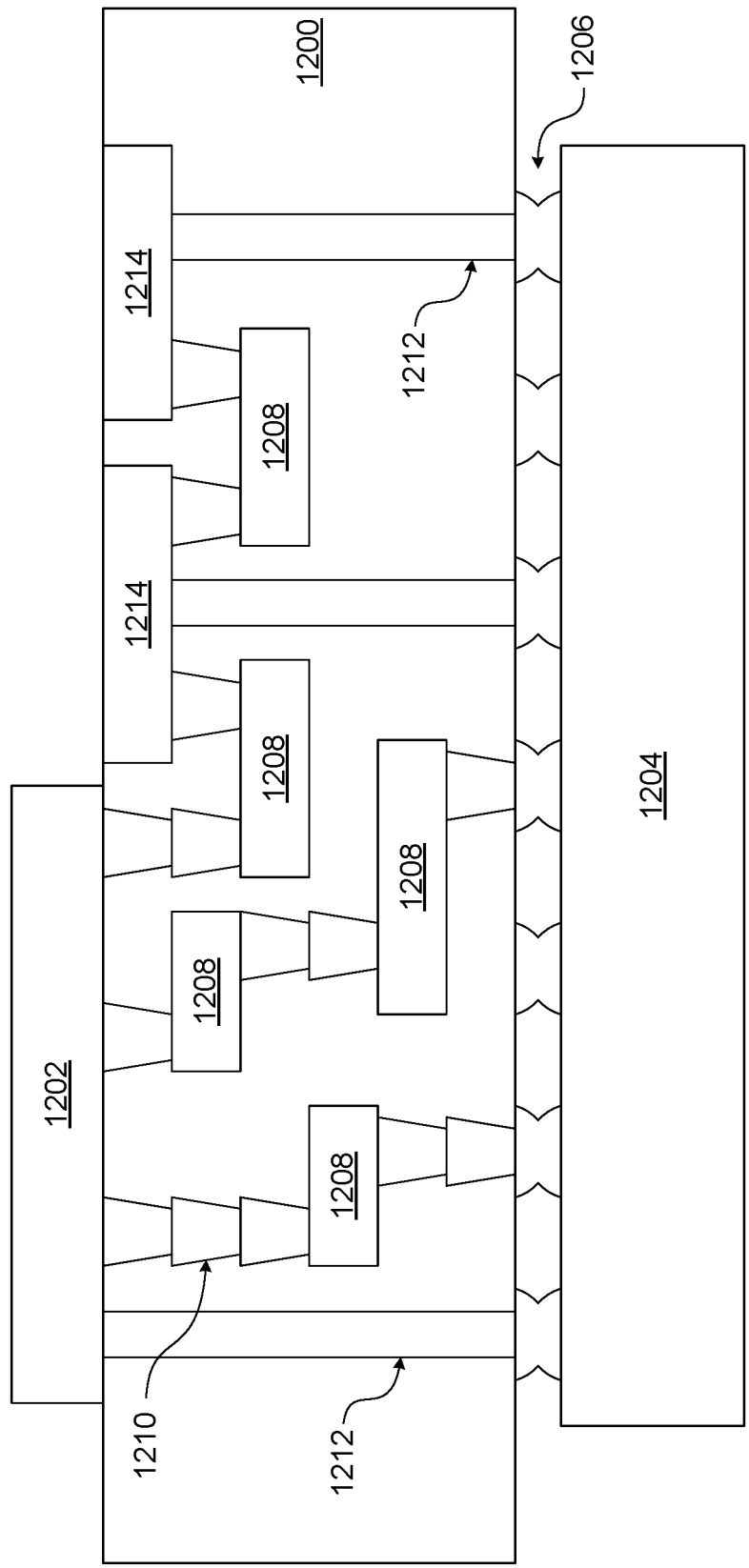
FIG. 12 is a cross-sectional view of an interposer implementing one or more embodiments.

FIG. 12 illustrates an interposer 1200 that includes one or more embodiments. The interposer 1200 is an intervening substrate used to bridge a first substrate 1202 to a second substrate 1204. The first substrate 1202 may be, for instance, an integrated circuit die. The second substrate 1204 may be, for instance, a memory module, a computer motherboard, or another integrated circuit die. Generally, the purpose of an interposer 1200 is to spread a connection to a wider pitch or to reroute a connection to a different connection. For example, an interposer 1200 may couple an integrated circuit die to a ball grid array (BGA) 1206 that can subsequently be coupled to the second substrate 1204. In some embodiments, the first and second substrates 1202, 1204 are attached to opposing sides of the interposer 1200. In other embodiments, the first and second substrates 1202, 1204 are attached to the same side of the interposer 1200. And in further embodiments, three or more substrates are interconnected by way of the interposer 1200.

The interposer 1200 may be formed of an epoxy resin, a fiberglass-reinforced epoxy resin, a ceramic material, or a polymer material such as polyimide. In further implementations, the interposer may be formed of alternate rigid or flexible materials that may include the same materials described above for use in a semiconductor substrate, such as silicon, germanium, and other group III-V and group IV materials.

The interposer may include metal interconnects 1208 and vias 1210, including but not limited to through-silicon vias (TSVs) 1212. The interposer 1200 may further include embedded devices 1214, including both passive and active devices. Such devices include, but are not limited to, capacitors, decoupling capacitors, resistors, inductors, fuses, diodes, transformers, sensors, and electrostatic discharge (ESD) devices. More complex devices such as radio-frequency (RF) devices, power amplifiers, power management devices, antennas, arrays, sensors, and MEMS devices may also be formed on the interposer 1200. In accordance with some embodiments, apparatuses or processes disclosed herein may be used in the fabrication of interposer 1200.

In one or more first embodiments, a photonic device comprises a package substrate, and a photonic integrated circuit (PIC) chip which extends over a first region of the package substrate, the PIC chip comprising a plurality of coplanar photonic waveguides, and a plurality of coplanar integrated edge-oriented couplers (IECs), wherein individual ones of the plurality of coplanar IECs each terminate a respective one of the coplanar photonic waveguides with a respective divergent lens surface that is substantially flat over at least the thickness, wherein a planar optical waveguide structure of the photonic device extends over a second region of the package substrate, the planar optical waveguide structure comprising a core, wherein an edge of the core is adjacent to the plurality of coplanar IECs.

In one or more second embodiments, further to the first embodiment, the planar optical waveguide structure is a waveguide preform which is coupled to the package substrate independent of the PIC.

In one or more third embodiments, further to the first embodiment or the second embodiment, PIC comprises the planar optical waveguide structure.

In one or more fourth embodiments, further to the first embodiment through third embodiments, the PIC forms a stepped structure, an upper portion of the stepped structure comprises the plurality of coplanar IECs, a lower portion of the stepped structure extends past the plurality of coplanar IECs, and the planar optical waveguide structure overlaps the lower portion.

In one or more fifth embodiments, further to any of the first through fourth embodiments, the edge of the planar optical waveguide structure comprises a plurality of surface recesses, and individual ones of the plurality of surface recesses each interface with a corresponding one of the plurality of coplanar IECs.

In one or more sixth embodiments, further to the fifth embodiment, individual ones of the plurality of surface recesses have a profile complementary to a profile of a respective divergent lens surface of the plurality of coplanar IECs.

In one or more seventh embodiments, further to the sixth embodiment, individual ones of the plurality of surface recesses each form a respective substantially flat surface over at least a partial thickness of the core.

In one or more eighth embodiments, further to the seventh embodiment, individual ones of the plurality of surface recesses extend through an entire thickness of a bottom cladding of the planar optical waveguide structure.

In one or more ninth embodiments, further to the seventh embodiment, a first divergent lens surface of the plurality of coplanar IECs is semicylindrical, and a first surface recess of the plurality of surface recesses is semicylindrical.

In one or more tenth embodiments, further to the fifth embodiment, the edge of the planar optical waveguide structure is a first edge, and the plurality of surface recesses is a first plurality of surface recesses, wherein a second edge of the planar optical waveguide structure, opposite the first edge, comprises a second plurality of concave lens surfaces.

In one or more eleventh embodiments, further to the tenth embodiment, the second plurality of concave lens surfaces comprise a plurality of semispherical surfaces, and wherein the planar optical waveguide structure optically couples individual ones of the plurality of coplanar IECs to individual ones of the spherical surfaces.

In one or more twelfth embodiments, further to the tenth embodiment, the photonic device further comprises a plurality of optical fibers over a third region of the package substrate, wherein individual ones of the optical fibers are optically coupled to individual ones of the second plurality of concave lens surfaces.

In one or more thirteenth embodiments, further to any of the first through fifth embodiments, the edge of the planar optical waveguide structure is a first edge, the photonic device further comprises a plurality of optical fibers adjacent to a second edge of the planar optical waveguide structure, opposite the first edge.

In one or more fourteenth embodiments, a photonic integrated circuit (PIC) chip comprises a substrate, a plurality of coplanar photonic waveguides within a thickness of a material over a plane of the substrate, and a plurality of coplanar integrated edge-oriented couplers (IECs), wherein individual ones of the plurality of coplanar IECs each terminate a respective one of the coplanar photonic waveguides with a respective divergent lens surface that is substantially flat over at least the thickness, wherein the PIC forms a stepped structure, an upper portion of the stepped structure comprises the plurality of coplanar IECs, and a lower portion of the stepped structure extends past the plurality of coplanar IECs.

In one or more fifteenth embodiments, further to the fourteenth embodiment, the PIC chip further comprises a planar optical waveguide structure comprising a core, wherein an edge of the core is adjacent to the plurality of coplanar IECs.

In one or more sixteenth embodiments, further to the fourteenth embodiment or the fifteenth embodiment, a first divergent lens surface of the plurality of coplanar IECs comprises a plurality of discrete diffractive edge facets symmetrically distributed about a primary axis of the first divergent lens surface, and wherein individual ones of the edge facets are substantially flat.

In one or more seventeenth embodiments, further to any of the fourteenth through sixteenth embodiments, a first divergent lens surface of the plurality of coplanar IECs is substantially semicylindrical, and wherein a radius of curvature of the first divergent lens surface is symmetrical about a primary axis of the first divergent lens surface.

In one or more eighteenth embodiments, further to the seventeenth embodiment, the primary axis of the first divergent lens surface is in a lateral alignment with an optical axis of a first photonic waveguide of the plurality of photonic waveguides, wherein the radius of curvature is equal to or larger than one half of a width of the first photonic waveguide.

In one or more nineteenth embodiments, further to any of the fourteenth through seventeenth embodiments, a first divergent lens surface of the plurality of coplanar IECs extends a depth into the substrate.

In one or more twentieth embodiments, further to the nineteenth embodiment, the material is silicon, and the substrate comprises an underlayer and a layer of silicon dioxide between the silicon and the underlayer.

In one or more twenty-first embodiments, further to the twentieth embodiment, the first divergent lens surface stops at, or within, the layer of silicon dioxide.

In one or more twenty-second embodiments, further to the twentieth embodiment, the first divergent lens surface extends at least partially through the underlayer.

In one or more twenty-third embodiments, a system comprises a packaged device comprising package substrate, a photonic integrated circuit (PIC) chip which extends over a first region of the package substrate, the PIC chip comprising a plurality of coplanar photonic waveguides within a thickness of a material over a plane of the substrate, a plurality of coplanar integrated edge-oriented couplers (IECs), wherein individual ones of the plurality of coplanar IECs each terminate a respective one of the coplanar photonic waveguides with a respective divergent lens surface that is substantially flat over at least the thickness wherein a planar optical waveguide structure of the photonic device is over a second region of the package substrate, planar optical waveguide structure comprising a core, wherein an edge of the core is adjacent to the plurality of coplanar IECs, a connector coupled to the packaged device, the connector comprising an array of optical fibers adjacent to the planar optical waveguide structure, and a printed circuit board coupled to the packaged circuit device.

In one or more twenty-fourth embodiments, further to the twenty-third embodiment, the planar optical waveguide structure is a waveguide preform which is coupled to the package substrate independent of the PIC.

In one or more twenty-fifth embodiments, further to the twenty-third embodiment or the twenty-fourth embodiment, the PIC comprises the planar optical waveguide structure.

In one or more twenty-sixth embodiments, further to any of the twenty-third through twenty-fifth embodiments, an edge of the PIC forms a stepped structure, an upper portion of the stepped structure comprises the plurality of coplanar IECs, a lower portion of the stepped structure extends past the plurality of coplanar IECs, and the planar optical waveguide structure overlaps the lower portion.

In one or more twenty-seventh embodiments, further to any of the twenty-third through twenty-sixth embodiments, the edge of the planar optical waveguide structure comprises a plurality of surface recesses, and individual ones of the plurality of surface recesses each interface with a corresponding one of the plurality of coplanar IECs.

In one or more twenty-eighth embodiments, further to the twenty-seventh embodiment, individual ones of the plurality of surface recesses have a profile complementary to a profile of a respective divergent lens surface of the plurality of coplanar IECs.

In one or more twenty-ninth embodiments, further to the twenty-eighth embodiment, individual ones of the plurality of surface recesses each form a respective substantially flat surface over at least a partial thickness of the core.

In one or more thirtieth embodiments, further to the twenty-ninth embodiment, individual ones of the plurality of surface recesses extend through an entire thickness of a bottom cladding of the planar optical waveguide structure.

In one or more thirty-first embodiments, further to the twenty-ninth embodiment, a first divergent lens surface of the plurality of coplanar IECs is semicylindrical, and a first surface recess of the plurality of surface recesses is semicylindrical.

In one or more thirty-second embodiments, further to the twenty-seventh embodiment, the edge of the planar optical waveguide structure is a first edge, and the plurality of surface recesses is a first plurality of surface recesses, wherein a second edge of the planar optical waveguide structure, opposite the first edge, comprises a second plurality of concave lens surfaces.

In one or more thirty-third embodiments, further to the thirty-third embodiment, the second plurality of concave lens surfaces comprise a plurality of semispherical surfaces, and wherein the planar optical waveguide structure optically couples individual ones of the plurality of coplanar IECs to individual ones of the spherical surfaces.

In one or more thirty-fourth embodiments, a method comprises receiving a substrate, patterning a plurality of coplanar optical waveguides into a thickness of a material over a plane of the substrate, subtractively patterning divergent lens profiles each at a terminus of a respective one of the plurality of coplanar optical waveguides, wherein the divergent lens profiles are each substantially flat over at least the thickness, and singulating a photonic integrated circuit (PIC) chip comprising the plurality of coplanar optical waveguides, the divergent lens profiles, and a portion of the substrate, wherein integrated edge-oriented couplers (IECs) of the PIC chip each comprise a respective one of the divergent lens profiles.

In one or more thirty-fifth embodiments, further to the thirty-fourth embodiment, the material is silicon, and wherein the substrate comprises an underlayer and a layer of silicon dioxide between the silicon and the underlayer, the method further comprising removing a portion of the silicon to expose a region of the layer of silicon dioxide, and forming a planar optical waveguide structure on the region, the planar optical waveguide structure comprising a core, wherein an edge of the core is adjacent to the plurality of coplanar IECs.

In one or more thirty-sixth embodiments, further to the thirty-fourth embodiment or the thirty-fifth embodiment, subtractively patterning the divergent lens profiles comprises masking the material and anisotropically etching through the thickness of the material.

In one or more thirty-seventh embodiments, further to the thirty-sixth embodiment, the etching is stopped within the substrate.

In one or more thirty-eighth embodiments, further to any of the thirty-fourth through thirty-fifth embodiments, the method further comprises coupling the PIC chip over a first region of a package substrate, coupling a planar optical waveguide structure over a second region of the package substrate, the planar optical waveguide structure comprising a core, wherein an edge of the core is adjacent to the plurality of coplanar IECs In one or more thirty-ninth embodiments, further to the thirty-eighth embodiment, the method further comprises coupling an array of optical fibers to the planar optical waveguide structure.

Techniques and architectures for optically coupling a photonic integrated circuit with optical fibers via a waveguide are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A photonic device comprising:
    a package substrate; and
    a photonic integrated circuit (PIC) chip which extends over a first region of the package substrate, the PIC chip comprising:
        a plurality of coplanar photonic waveguides within a thickness of a material of the PIC chip; and
        a plurality of coplanar integrated edge-oriented couplers (IECs), wherein individual ones of the plurality of coplanar IECs each terminate a respective one of the coplanar photonic waveguides with a respective divergent lens surface that is substantially flat over at least the thickness;
    wherein:
    a planar optical waveguide structure of the photonic device extends over a second region of the package substrate, the planar optical waveguide structure comprising a core, which extends to a first edge of the planar optical waveguide structure, wherein the first edge is adjacent to the plurality of coplanar IECs; and
    a plurality of optical fibers of the photonic device are adjacent to a second edge of the planar optical waveguide structure, the second edge opposite the first edge.

2. The photonic device of claim 1, wherein the planar optical waveguide structure is a waveguide preform which is coupled to the package substrate independent of the PIC chip.

3. The photonic device of claim 1, wherein PIC chip comprises the planar optical waveguide structure.

4. The photonic device of claim 1, wherein:
    the PIC chip forms a stepped structure;
    an upper portion of the stepped structure comprises the plurality of coplanar IECs;
    a lower portion of the stepped structure extends past the plurality of coplanar IECs; and
    the planar optical waveguide structure overlaps the lower portion.

5. The photonic device of claim 1, wherein:
    the first edge of the planar optical waveguide structure comprises a plurality of surface recesses; and
    individual ones of the plurality of surface recesses each interface with a corresponding one of the plurality of coplanar IECs.

6. The photonic device of claim 5, wherein individual ones of the plurality of surface recesses have a profile complementary to a profile of a respective divergent lens surface of the plurality of coplanar IECs.

7. The photonic device of claim 6, wherein individual ones of the plurality of surface recesses each form a respective substantially flat surface over at least a partial thickness of the core.

8. The photonic device of claim 7, wherein individual ones of the plurality of surface recesses extend through an entire thickness of a bottom cladding of the planar optical waveguide structure.

9. The photonic device of claim 5, wherein the plurality of surface recesses is a first plurality of surface recesses, wherein the second edge comprises a second plurality of concave lens surfaces.

10. A photonic integrated circuit (PIC) chip comprising:
    a substrate;
    a plurality of coplanar photonic waveguides within a thickness of a material over a plane of the substrate; and
    a plurality of coplanar integrated edge-oriented couplers (IECs), wherein individual ones of the plurality of coplanar IECs each terminate a respective one of the coplanar photonic waveguides with a respective divergent lens surface that is substantially flat over at least the thickness;
    wherein:
    the PIC chip forms a stepped structure;
    an upper portion of the stepped structure comprises the plurality of coplanar IECs;
    a lower portion of the stepped structure extends past the plurality of coplanar IECs;
    the plurality of coplanar IECs comprises a first divergent lens surface; and
    the lower portion extends past the first divergent lens surface by at least an amount which is equal to a depth of a curvature of the first divergent lens surface over the lower portion.

11. The PIC chip of claim 10, further comprising a planar optical waveguide structure comprising a core, wherein an edge of the core is adjacent to the plurality of coplanar IECs.

12. The PIC chip of claim 10, wherein the first divergent lens surface comprises a plurality of discrete diffractive edge facets symmetrically distributed about a primary axis of the first divergent lens surface, and wherein individual ones of the plurality of discrete diffractive edge facets are substantially flat.

13. The PIC chip of claim 10, wherein the first divergent lens surface is substantially semicylindrical, and wherein a radius of curvature of the first divergent lens surface is symmetrical about a primary axis of the first divergent lens surface.

14. A system comprising:
a packaged device comprising:
  package substrate;
  a photonic integrated circuit (PIC) chip which extends over a first region of the package substrate, the PIC chip comprising:
    a plurality of coplanar photonic waveguides within a thickness of a material of the PIC chip;
    a plurality of coplanar integrated edge-oriented couplers (IECs), wherein individual ones of the plurality of coplanar IECs each terminate a respective one of the coplanar photonic waveguides with a respective divergent lens surface that is substantially flat over at least the thickness
  wherein a planar optical waveguide structure of the packaged device is over a second region of the package substrate, planar optical waveguide structure comprising a core which extends to a first edge of the planar optical waveguide structure, wherein the first edge is adjacent to the plurality of coplanar IECs;
  a connector coupled to the packaged device, the connector comprising an array of optical fibers adjacent to the planar optical waveguide structure; and
  a printed circuit board coupled to the packaged device.

15. The system of claim 14, wherein the planar optical waveguide structure is a waveguide preform which is coupled to the package substrate independent of the PIC chip.

16. The system of claim 14, wherein PIC chip comprises the planar optical waveguide structure.

17. The system of claim 14, wherein:
an edge of the PIC chip forms a stepped structure;
an upper portion of the stepped structure comprises the plurality of coplanar IECs;
a lower portion of the stepped structure extends past the plurality of coplanar IECs; and
the planar optical waveguide structure overlaps the lower portion.

18. The system of claim 14, wherein:
the first edge of the planar optical waveguide structure comprises a plurality of surface recesses; and
individual ones of the plurality of surface recesses each interface with a corresponding one of the plurality of coplanar IECs.

* * * * *